(12) United States Patent  
Kameshima et al.

(10) Patent No.: US 11,673,489 B2  
(45) Date of Patent: Jun. 13, 2023

(54) SEATING SENSOR AND SEAT DEVICE

(71) Applicants: Fujikura Ltd., Tokyo (JP); HONDA MOTOR CO., LTD., Tokyo (JP)

(72) Inventors: Takashi Kameshima, Sakura (JP); Takashi Furukawa, Wako (JP)

(73) Assignees: FUJIKURA LTD., Tokyo (JP); HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 17/419,829

(22) PCT Filed: Dec. 26, 2019

(86) PCT No.: PCT/JP2019/051317  
§ 371 (c)(1),  
(2) Date: Jun. 30, 2021

(87) PCT Pub. No.: WO2020/141603  
PCT Pub. Date: Jul. 9, 2020

(65) Prior Publication Data  
US 2022/0080859 A1 Mar. 17, 2022

(30) Foreign Application Priority Data  
Jan. 4, 2019 (JP) .............................. JP2019-000323

(51) Int. Cl.  
*B60N 2/00* (2006.01)  
*B60N 2/70* (2006.01)

(52) U.S. Cl.  
CPC .......... *B60N 2/002* (2013.01); *B60N 2/7094* (2013.01)

(58) Field of Classification Search  
CPC .......... B60N 2/002; B60N 2/7094; A47C 7/62  
(Continued)

(56) References Cited

U.S. PATENT DOCUMENTS 11,498,456 B2 * 11/2022 Ozawa .................. B60N 2/002  
2016/0371899 A1 * 12/2016 Fujii .................... G07C 5/0808  
(Continued)

FOREIGN PATENT DOCUMENTS

JP  2005-231539 A  9/2005  
JP  2009-189555 A  8/2009  
(Continued)

OTHER PUBLICATIONS

International Search Report dated Mar. 10, 2020, issued in counterpart application No. PCT/JP2019/051317, w/ English translation (5 pages).

*Primary Examiner* — Mark R Wendell  
(74) *Attorney, Agent, or Firm* — WHDA, LLP

(57) ABSTRACT

A first pressure-sensitive switch group of a seating sensor includes first pressure-sensitive switches (SW11 to SW13) and second pressure-sensitive switches (SW21 to SW23) located on one side of a seat in a left-right direction from the first pressure-sensitive switches, and includes a first pressure-sensitive switch pair including the first pressure-sensitive switch (SW11) and the second pressure-sensitive switch (SW21), and the first pressure-sensitive switch (SW13) and the second pressure-sensitive switch (SW22) located between the first pressure-sensitive switch (SW11) and the second pressure-sensitive switch (SW21), a second pressure-sensitive switch pair including the first pressure-sensitive switch (SW12) and the second pressure-sensitive switch (SW22), and a third pressure-sensitive switch pair including the first pressure-sensitive switch (SW13) and the second pressure-sensitive switch (SW23), in which seating is detected when both the first pressure-sensitive switch and the second pressure-sensitive switch in at least one of the first to third pressure-sensitive switch pairs are turned on.

8 Claims, 7 Drawing Sheets

(58) Field of Classification Search
USPC .................................................... 297/217.3
See application file for complete search history.

(56) References Cited

U.S. PATENT DOCUMENTS

| | | | | |
|---|---|---|---|---|
| 2020/0307414 A1* | 10/2020 | Ozawa | .................. | B60N 2/002 |
| 2022/0080859 A1* | 3/2022 | Kameshima | ........... | B60N 2/002 |
| 2022/0177162 A1* | 6/2022 | Hessenberger | .......... | B60N 2/70 |

FOREIGN PATENT DOCUMENTS

| | | |
|---|---|---|
| JP | 2010-195343 A | 9/2010 |
| JP | 2012-86780 A | 5/2012 |
| JP | 2013-190233 A | 9/2013 |
| JP | 2017-109728 A | 6/2017 |
| JP | 2017-185979 A | 10/2017 |
| WO | 2007/028819 A1 | 3/2007 |
| WO | 2012/053620 A1 | 4/2012 |
| WO | 2013/002289 A1 | 1/2013 |

\* cited by examiner

SEATING SENSOR AND SEAT DEVICE

TECHNICAL FIELD

The present invention relates to a seating sensor and a seat device, and is suitable for appropriately detecting seating.

BACKGROUND ART

As one of safety systems in vehicles, an alarm system that warns that the seatbelt is not worn when riding has been put into practical use. In this alarm system, a warning is issued when the seatbelt wearing is not detected while person seating is detected. As a device for detecting person seating, a seating sensor that detects seating by a load may be used.

As such a seating sensor, a seating detection device of Patent Literature 1 below has been proposed. The seating detection device of Patent Literature 1 below includes a pressure-sensitive switch group including four pressure-sensitive switches arranged at intervals in the left-right direction of a seat.

[Patent Literature 1] WO 2007/028819 A1

SUMMARY OF INVENTION

In the pressure-sensitive switch group in the seating detection device of Patent Literature 1, the distance between the two pressure-sensitive switches located on the right side and the distance between the two pressure-sensitive switches located on the left side are short, and a region is formed in which the pressure-sensitive switch is not arranged at the central portion in the left-right direction. Therefore, it is conceivable that this seating detection device has a configuration in which seating is detected when either one of the two pressure-sensitive switches located on the right side of the pressure-sensitive switch group and either one of the two pressure-sensitive switches located on the left side are turned on. Accordingly, it is conceivable that this seating detection device can detect seating of an occupant even when the occupant is seated on the seat in so-called side sitting with the buttocks shifted to the left-right direction as compared with the normal sitting, which is a normal way of sitting. However, in this seating detection device, since the two pressure-sensitive switches are located on each of the left and right as described above, the switches cannot be appropriately arranged in each of three patterns of normal sitting and left and right side sitting, and therefore, it is impossible to appropriately detect the seating in all of the normal sitting and the left and right side sitting.

Further, there is a request for seating detection devices to suppress false detection due to luggage. For example, a child seat may be placed on a seat as luggage. In general, a load applied to a seat by a child seat tends to act on both ends in left-right direction of the seat. When a load acts on both ends in the left-right direction of the seat due to luggage placed on the seat as described above, in the seating detection device of Patent Literature 1, there is a case where the pressure-sensitive switch located on the rightmost side and the pressure-sensitive switch located on the leftmost side are turned on and false detection occurs due to luggage. In general, luggage tends to be placed in the central portion of the seat in the left-right direction. When luggage is placed in the central portion of the seat as described above, in the seating detection device of Patent Literature 1, there is a possibility that the two pressure-sensitive switches located on the central side are turned on and false detection occurs due to luggage.

Therefore, an object of the present invention is to provide a seating sensor and a seat device capable of appropriately detecting seating and suppressing false detection of luggage.

In order to solve the above problems, a seating sensor of the present invention includes a first pressure-sensitive switch group including at least six pressure-sensitive switches arranged along a left-right direction of a seat, the first pressure-sensitive switch group including three first pressure-sensitive switches and three second pressure-sensitive switches located on one side of the seat in the left-right direction from the three first pressure-sensitive switches, and including a first pressure-sensitive switch pair including one of the first pressure-sensitive switches and one of the second pressure-sensitive switches, and another one of the first pressure-sensitive switches and another one of the second pressure-sensitive switches located between the one of the first pressure-sensitive switches and the one of the second pressure-sensitive switches, a second pressure-sensitive switch pair including a farthest one of the first pressure-sensitive switches from the second pressure-sensitive switches and a closest one of the second pressure-sensitive switches to the first pressure-sensitive switches, and a third pressure-sensitive switch pair including a closest one of the first pressure-sensitive switches to the second pressure-sensitive switches and a farthest one of the second pressure-sensitive switches from the first pressure-sensitive switches, in which seating is detected when both the first pressure-sensitive switches and the second pressure-sensitive switches in at least one of the first to third pressure-sensitive switch pairs are turned on.

In this seating sensor, the second pressure-sensitive switch pair is located on one side of the seat in the left-right direction of the seat from the first pressure-sensitive switch pair, and the third pressure-sensitive switch pair is located on another side in the left-right direction of the seat from the first pressure-sensitive switch pair. Therefore, when the seat is arranged so that the center of the seat in the left-right direction is located between the first pressure-sensitive switch and the second pressure-sensitive switch, both the first pressure-sensitive switch and the second pressure-sensitive switch in at least the first pressure-sensitive switch pair are turned on when an occupant is seated in normal sitting. When an occupant is seated in side sitting, both the first pressure-sensitive switch and the second pressure-sensitive switch in at least the second pressure-sensitive switch pair or the third pressure-sensitive switch pair are turned on. Therefore, according to this seating sensor, seating of an occupant can be appropriately detected in all the patterns of normal sitting and left and right side sitting. In this seating sensor, the pressure-sensitive switch located at one end in the left-right direction of the seat is the first pressure-sensitive switch in the second pressure-sensitive switch pair, and the pressure-sensitive switch located at another end in the left-right direction of the seat is the second pressure-sensitive switch in the third pressure-sensitive switch pair. Therefore, according to this seating sensor, seating is not detected even when luggage that applies a load acting on both ends in the left-right direction of the seat is placed on the seat and both pressure-sensitive switches located at both ends in the left-right direction of the seat are turned on. Accordingly, according to this seating sensor, it is possible to suppress false detection due to such luggage being placed on a seat. On the other hand, as described above, when the seat is arranged so that the center of the seat in the left-right direction is located between the first pressure-sensitive switch and the second pressure-sensitive switch in the first pressure-sensitive switch pair, the two pressure-sensitive switches near the center in the left-right direction of the seat are pressure-sensitive switches in the pressure-sensitive switch pairs different from each other. Therefore, even when luggage is placed on the seat and the two pressure-sensitive switches near the center of the seat in the left-right direction are turned on, seating is not detected. In this seating sensor, two pressure-sensitive switches included in another pressure-sensitive switch pair are located between the first pressure-sensitive switch and the second pressure-sensitive switch in each pressure-sensitive switch pair. Therefore, the two pressure-sensitive switches in each pressure-sensitive switch pair can be separated from each other, and false detection due to larger luggage being placed on the seat can be suppressed. Accordingly, according to this seating sensor, seating can be appropriately detected and false detection of luggage can be suppressed.

Each of the pressure-sensitive switches in the first pressure-sensitive switch group may be located behind a hip point of the seat.

When an occupant is seated, a maximum load or a load close to the maximum load is applied to a portion of the seat corresponding to the roughly central portion of the right buttock and a portion corresponding to the roughly central portion of the left buttock. When an adult is seated in normal sitting, positions in the front-rear direction of these two portions to which large loads are applied tend to be at or near a position in the front-rear direction of the hip point. On the other hand, when a child is seated in normal sitting so that the back is attached to the backrest, the buttocks of the child are smaller than the buttocks of the adult, so the position in the front-rear direction of the portion where a large load is applied tends to be located behind the hip point. Therefore, with the configuration as described above, as compared with the case where each pressure-sensitive switch of the first pressure-sensitive switch group is located in front of the hip point of the seat, it is possible to make each pressure-sensitive switch close to the portion where a large load is applied in a case of normal sitting by a child. Therefore, according to this seating sensor, seating of a child can be appropriately detected. Note that the adult in the present specification is a woman who weighs approximately 50 kg. The hip point is a position of the hip point in a three-dimensional sitting mannequin when the three-dimensional sitting mannequin based on JIS-D4607 is seated on the seat.

In this case, it is preferable that the distance between each of the pressure-sensitive switches and the hip point in the front-rear direction of the seat is more than 0 mm and 40 mm or less.

With this configuration, it is possible to prevent the pressure-sensitive switches in the first pressure-sensitive switch group from being significantly separated from a portion where a large load is applied in a case of normal sitting by an adult, while making the pressure-sensitive switch close to a portion where a large load is applied in a case of seating by a child in a manner as described above. Therefore, according to this seating sensor, it is possible to more appropriately detect seating of a child while detecting seating of an adult.

It is preferable that the distance between the first pressure-sensitive switch and the second pressure-sensitive switch in each of the first to third pressure-sensitive switch pairs is 75 mm or more and less than 120 mm.

The lower limit of the distance between the two portions where large loads are applied as described above in a case of seating by a child is approximately 75 mm, and the distance between the two portions where a large load is applied in a case of seating by an adult is approximately 120 mm. Therefore, with the configuration as described above, it is possible to prevent the distance between the first pressure-sensitive switch and the second pressure-sensitive switch in each pressure-sensitive switch pair from being significantly separated from the distance between portions where large loads are applied in a case of seating by an adult, while making the distance between the first pressure-sensitive switch and the second pressure-sensitive switch in each pressure-sensitive pair close to the distance between the portions where large loads are applied in a case of seating by a child. Therefore, according to this seating sensor, it is possible to more appropriately detect seating of a child and seating of an adult. According to this seating sensor, it is possible to suppress false detection due to luggage as compared with the case where the distance between the first pressure-sensitive switch and the second pressure-sensitive switch in the pressure-sensitive switch pair is less than 75 mm.

It is preferable that the pressure-sensitive switches in the first pressure-sensitive switch group overlap with a straight line extending in the left-right direction of the seat in a plan view.

With this configuration, the pressure-sensitive switches in the first pressure-sensitive switch group are prevented from shifting in the front-rear direction although being along the left-right direction of the seat, as compared with the case where the pressure-sensitive switches in the first pressure-sensitive switch group do not overlap with the straight line extending in the left-right direction of the seat in a plan view. Therefore, according to this seating sensor, it is possible to more appropriately detect seating when an occupant is seated on the seat in side sitting.

It is preferable that the seating sensor further includes a second pressure-sensitive switch group including at least four of the pressure-sensitive switches arranged along the left-right direction of the seat on a front side of the seat from the first pressure-sensitive switch group, in which seating is detected when both the first pressure-sensitive switch and the second pressure-sensitive switch in at least one of the first to third pressure-sensitive switch pairs, or at least two of the pressure-sensitive switches in the second pressure-sensitive switch group are turned on.

With this configuration, when an occupant is seated in so-called front sitting in which the buttock is shifted to forward as compared with the normal sitting, the occupant's seating can be detected by the pressure-sensitive switch in the second pressure-sensitive switch group. Therefore, according to this seating sensor, even when an occupant is seated in front sitting, it is possible to appropriately detect seating.

In this case, it is preferable that the second pressure-sensitive switch group includes pressure-sensitive switch pairs respectively corresponding to each of the first to third pressure-sensitive switch pairs in the first pressure-sensitive switch group.

With this configuration, it is possible to appropriately detect seating even when an occupant is seated with the buttocks shifted forward and in the left-right direction as compared with the normal sitting.

In this case, one of the pressure-sensitive switches in each of the pressure-sensitive switch pairs of the second pressure-sensitive switch group and the first pressure-sensitive switch in the pressure-sensitive switch pair of the first pressure-sensitive switch group corresponding to the each of the pressure-sensitive switch pairs overlap with a straight line extending in a front-rear direction of the seat in a plan view, and another one of the pressure-sensitive switches in each of the pressure-sensitive switch pairs of the second pressure-sensitive switch group and the second pressure-sensitive switch in the pressure-sensitive switch pair in the first pressure-sensitive switch group corresponding to the each of the pressure-sensitive switch pairs overlap with another straight line extending in the front-rear direction of the seat in a plan view.

With this configuration, shifting in the left-right direction of the pressure-sensitive switch pair in the second pressure-sensitive switch group with respect to the pressure-sensitive switch pair in the first pressure-sensitive switch group is suppressed. Therefore, according to this seating sensor, it is possible to more appropriately detect seating even when an occupant is seated with the buttocks shifted forward and in the left-right direction as compared with the normal seating.

Further, a seat device of the present invention includes the seating sensor according to any one of the above and a cushion pad on which the seating sensor is arranged on a surface, in which the three first pressure-sensitive switches are located on one side from a center in a left-right direction of the seat, and the three second pressure-sensitive switches are located on another side of the center in the left-right direction of the seat.

In this seat device, the first pressure-sensitive switch group is prevented from being arranged biased in one side of the seat in the left-right direction as compared with a case where the first pressure-sensitive switch and the second pressure-sensitive switch are located on one of sides with respect to the center of the seat in the left-right direction. Accordingly, according to this seat device, it is possible to appropriately detect seating of an occupant even when the occupant is seated in the side sitting of being shifted to the right or when the occupant is seated in the side sitting of being shifted to the left.

As described above, according to the present invention, provided are a seating sensor and a seat device capable of appropriately detecting seating and suppressing false detection of luggage.

DESCRIPTION OF EMBODIMENTS

Hereinafter, preferred embodiments of a seating sensor and a seat device according to the present invention will be described in detail with reference to the drawings. Note that, for ease of understanding, the scale of each drawing may differ from the scale described in the following description.

Figure 1:
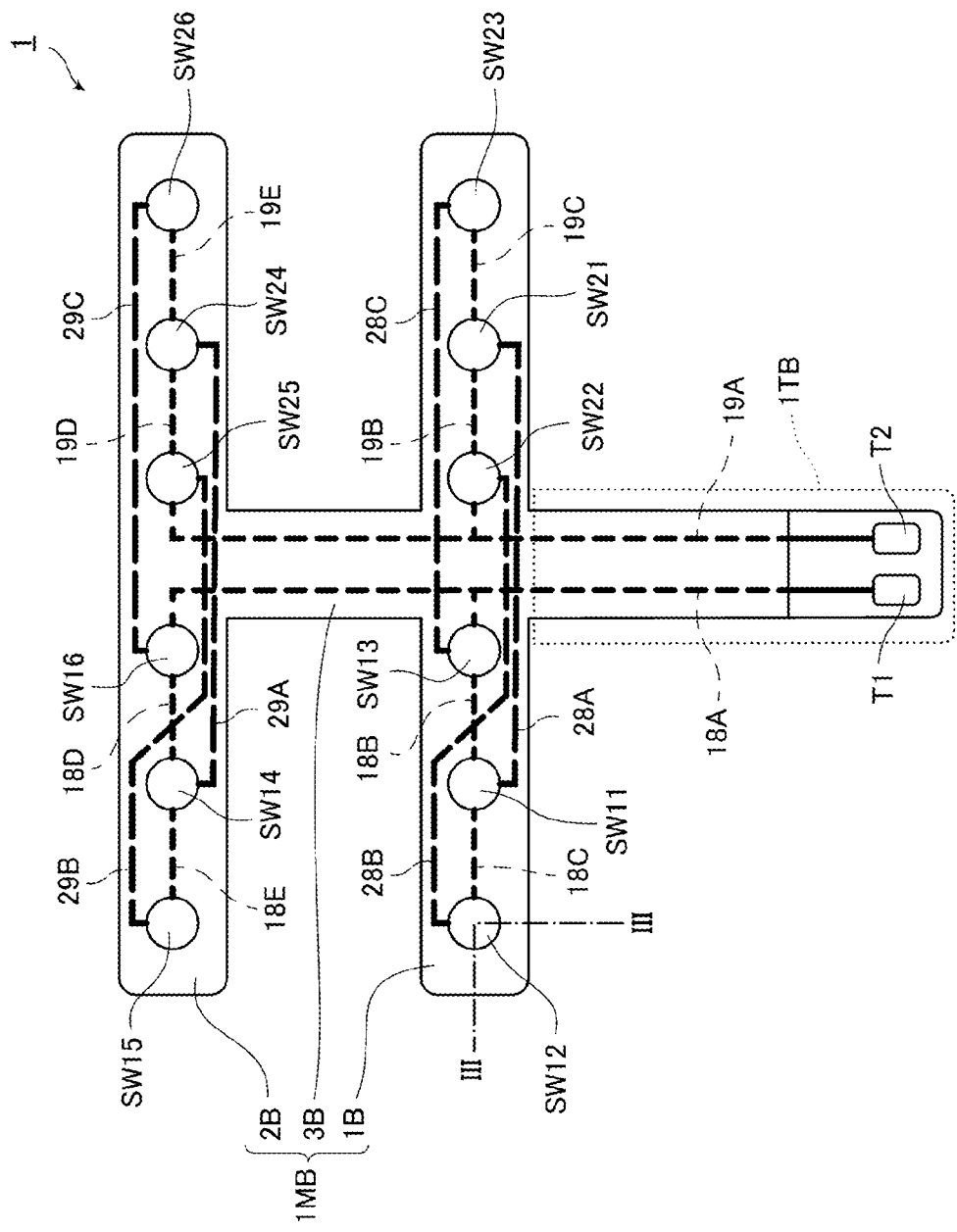
FIG. 1 is a plan view of a seating sensor according to an embodiment of the present invention.
Figure 2:
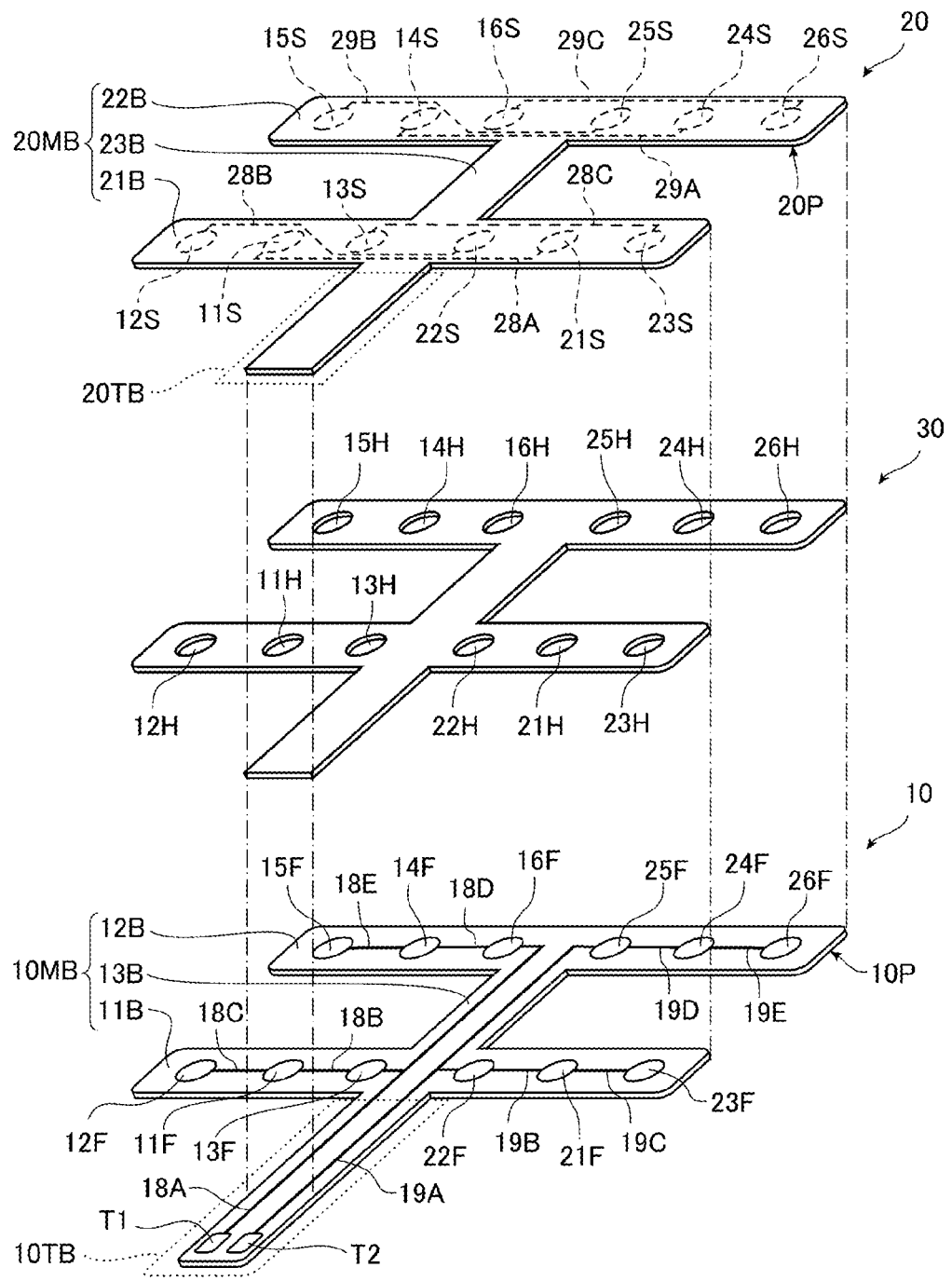
FIG. 2 is an exploded view of the seating sensor of FIG. 1.

FIG. 1 is a plan view of a seating sensor according to an embodiment of the present invention. FIG. 2 is an exploded view of a seating sensor 1 of FIG. 1. As illustrated in FIG. 2, the seating sensor 1 includes a first electrode sheet 10, a second electrode sheet 20, and a spacer 30.

The first electrode sheet 10 includes a first insulating sheet 10P, first electrodes 11F to 16F, second electrodes 21F to 26F, terminals T1, T2, and wirings 18A to 18E, 19A to 19E as main components.

The first insulating sheet 10P is made of an insulating and flexible sheet. Examples of the material constituting the first insulating sheet 10P include resins such as polyethylene terephthalate (PET), polyethylene naphthalate (PEN), and polyimide (PI). The first insulating sheet 10P includes an approximately H-shaped main block 10MB and a substantially rectangular tail block 10TB connected to the main block 10MB.

The main block 10MB includes a first band portion 11B extending in a predetermined direction, a second band portion 12B extending in a direction parallel to the extending direction of the first band portion 11B, and a third band portion 13B extending in a direction perpendicular to the extending direction of the first band portion 11B. The first band portion 11B and the second band portion 12B are arranged in parallel. One end of the third band portion 13B is connected to the central portion of the first band portion 11B in the extending direction, and the other end of the third band portion 13B is connected to the central portion of the second band portion 12B in the extending direction. As described above, the first band portion 11B and the second band portion 12B are connected by the third band portion 13B, and the main block 10MB has a substantially H-shape as described above. The tail block 10TB is connected to the central portion in the extending direction of the first band portion 11B, and extends in the same direction as the extending direction of the third band portion 13B on the side opposite to the third band portion 13B side.

Each of the first electrodes 11F to 16F and the second electrodes 21F to 26F of the first electrode sheet 10 has a substantially circular shape and is arranged on one surface of the main block 10MB. This one surface is a surface facing the second electrode sheet 20. The first electrodes 11F to 13F and the second electrodes 21F to 23F are arranged in the first band portion 11B at intervals along the extending direction of the first band portion 11B. The first electrodes 11F to 13F are located on one side from the center of the first band portion 11B in the extending direction, and the second electrodes 21F to 23F are located on another side from the center of the first band portion 11B in the extending direction. The first electrode 12F is located on one end side of the first band portion 11B from the first electrode 11F, and the first electrode 13F is located on the center side of the first band portion 11B in the extending direction from the first electrode 11F. The second electrode 22F is located on the center side of the first band portion 11B in the extending direction from the second electrode 21F, and the second electrode 23F is located on another end side of the first band portion 11B from the second electrode 21F.

Therefore, the first electrodes 11F to 13F and the second electrodes 21F to 23F are arranged in the order of the first electrode 12F, the first electrode 11F, the first electrode 13F, the second electrode 22F, the second electrode 21F, and the second electrode 23F from one end side of the first band portion 11B toward the other end side. In the present embodiment, with respect to a straight line passing through the center in the extending direction of the first band portion 11B and perpendicular to the extending direction of the first band portion 11B, the first electrode 11F and the second electrode 21F are arranged at symmetrical positions, the first electrode 12F and the second electrode 23F are arranged at symmetrical positions, and the first electrode 13F and the second electrode 22F are arranged at symmetrical positions. The first electrodes 11F to 13F and the second electrodes 21F to 23F overlap with a straight line (not shown) extending in the extending direction of the first band portion 11B in a plan view. The distance between the first electrode 11F and the first electrode 12F is the same as the distance between the first electrode 11F and the first electrode 13F, and the distance between the second electrode 21F and the second electrode 22F is the same as the distance between the second electrode 21F and the second electrode 23F.

The first electrodes 14F to 16F and the second electrodes 24F to 26F are arranged in the second band portion 12B at intervals along the extending direction of the second band portion 12B. The first electrodes 14F to 16F are located on one side from the center of the second band portion 12B in the extending direction, and the second electrodes 24F to 26F are located on another side from the center of the second band portion 12B in the extending direction. The first electrode 15F is located on one end side of the second band portion 12B from the first electrode 14F, and the first electrode 16F is located on the center side of the second band portion 12B in the extending direction from the first electrode 14F. The second electrode 25F is located on the center side of the second band portion 12B in the extending direction from the second electrode 24F, and the second electrode 26F is located on another end side of the second band portion 12B from the second electrode 24F.

Therefore, the first electrodes 14F to 16F and the second electrodes 24F to 26F are arranged in the order of the first electrode 15F, the first electrode 14F, the first electrode 16F, the second electrode 25F, the second electrode 24F, and the second electrode 26F from one end side of the second band portion 12B toward the other end side. In the present embodiment, with respect to a straight line passing through the center in the extending direction of the second band portion 12B and perpendicular to the extending direction of the second band portion 12B, the first electrode 14F and the second electrode 24F are arranged at symmetrical positions, the first electrode 15F and the second electrode 26F are arranged at symmetrical positions, and the first electrode 16F and the second electrode 25F are arranged at symmetrical positions. The first electrodes 14F to 16F and the second electrodes 24F to 26F overlap with a straight line (not shown) extending in the extending direction of the second band portion 12B in a plan view. In the present embodiment, the distance between the first electrode 14F and the first electrode 15F is the same as the distance between the first electrode 14F and the first electrode 16F, and the distance between the second electrode 24F and the second electrode 25F is the same as the distance between the second electrode 24F and the second electrode 26F. In the present embodiment, in a plan view, the first electrode 14F and the first electrode 11F, the first electrode 15F and the first electrode 12F, the first electrode 16F and the first electrode 13F, the second electrode 24F and the second electrode 21F, the second electrode 25F and the second electrode 22F, and the second electrode 26F and the second electrode 23F are arranged so as to overlap with a straight line (not shown) extending in a direction perpendicular to the extending direction of the first band portion 11B.

The pair of terminals T1, T2 described above are arranged on the tail block 10TB. The surface of the first insulating sheet 10P on which these terminals T1, T2 are arranged is the same surface as the surface of the first insulating sheet 10P on which the above electrodes are arranged.

One terminal T1 is electrically connected to the first electrode 13F and the first electrode 16F by the wiring 18A, the first electrode 13F and the first electrode 11F are electrically connected by the wiring 18B, the first electrode 11F and the first electrode 12F are electrically connected by the wiring 18C, the first electrode 16F and the first electrode 14F are electrically connected by the wiring 18D, and the first electrode 14F and the first electrode 15F are electrically connected by the wiring 18E. The other terminal T2 is electrically connected to the second electrode 22F and the second electrode 25F by the wiring 19A, the second electrode 22F and the second electrode 21F are electrically connected by the wiring 19B, the second electrode 21F and the second electrode 23F are electrically connected by the wiring 19C, the second electrode 25F and the second electrode 24F are electrically connected by the wiring 19D, and the second electrode 24F and the second electrode 26F are electrically connected by the wiring 19E.

The second electrode sheet 20 includes a second insulating sheet 20P, first electrodes 11S to 16S, second electrodes 21S to 26S, and wirings 28A to 28C, 29A to 29C as main components.

As similar to the first insulating sheet 10P, the second insulating sheet 20P is made of an insulating and flexible sheet. Accordingly, examples of a material constituting the second insulating sheet 20P include a material constituting the first insulating sheet 10P.

The second insulating sheet 20P includes a main block 20MB having the same shape as the main block 10MB of the first insulating sheet 10P, and a tail block 20TB connected to the main block 20MB and having a shape shorter than the tail block 10TB of the first insulating sheet 10P. Accordingly, the main block 20MB includes a first band portion 21B having the same shape as that of the first band portion 11B of the first insulating sheet and extending in a predetermined direction, a second band portion 22B having the same shape as that of the second band portion 12B of the first insulating sheet and extending in a direction parallel to the extending direction of the first band portion 21B, and a third band portion 23B having the same shape as that of the third band portion 13B of the first insulating sheet and extending in a direction perpendicular to the extending direction of the first band portion 21B. The first band portion 21B and the second band portion 22B are arranged in parallel. One end of the third band portion 23B is connected to the central portion of the first band portion 21B in the extending direction, and the other end of the third band portion 23B is connected to the central portion of the second band portion 22B in the extending direction.

Each of the first electrodes 11S to 16S and the second electrodes 21S to 26S of the second electrode sheet 20 has a shape congruent with the shape of each of the first electrodes 11F to 16F and the second electrodes 21F to 26F of the first electrode sheet 10, and is arranged on one surface of the main block 20MB. This one surface is a surface facing the first electrode sheet 10. The arrangement positions of the first electrodes 11S to 16S correspond to the positions of the first electrodes 11F to 16F of the first electrode sheet 10, and the arrangement positions of the second electrodes 21S to 26S correspond to the positions of the second electrodes 21F to 26F of the first electrode sheet 10. Therefore, when the first electrode sheet 10 and the second electrode sheet 20 are overlapped and viewed in a plan view, the first electrodes 11S to 16S of the second electrode sheet 20 overlap with the corresponding first electrodes 11F to 16F of the first electrode sheet 10, and the second electrodes 21S to 26S of the second electrode sheet 20 overlap with the corresponding second electrodes 21F to 26F of the first electrode sheet 10.

The first electrode 11S and the second electrode 21S are electrically connected by the wiring 28A, the first electrode 12S and the second electrode 22S are electrically connected by the wiring 28B, and the first electrode 13S and the second electrode 23S are electrically connected by the wiring 28C. The first electrode 14S and the second electrode 24S are electrically connected by the wiring 29A, the first electrode 15S and the second electrode 25S are electrically connected by the wiring 29B, and the first electrode 16S and the second electrode 26S are electrically connected by the wiring 29C.

In the present embodiment, as described above, each electrode is arranged at a position corresponding to each electrode of the first electrode sheet 10. With respect to a straight line passing through the center in the extending direction of the first band portion 21B and perpendicular to the extending direction of the first band portion 21B, the first electrode 11S and the second electrode 21S are arranged at symmetrical positions, the first electrode 12S and the second electrode 23S are arranged at symmetrical positions, and the first electrode 13S and the second electrode 22S are arranged at symmetrical positions. With respect to a straight line passing through the center in the extending direction of the second band portion 22B and perpendicular to the extending direction of the second band portion 22B, the first electrode 14S and the second electrode 24S are arranged at symmetrical positions, the first electrode 15S and the second electrode 26S are arranged at symmetrical positions, and the first electrode 16S and the second electrode 25S are arranged at symmetrical positions. The first electrodes 11S to 13S and the second electrodes 21S to 23S overlap with a straight line (not shown) extending in the extending direction of the first band portion 21B in a plan view, and the first electrodes 14S to 16S and the second electrodes 24S to 26S overlap with a straight line (not shown) extending in the extending direction of the second band portion 22B in a plan view. The distance between the first electrode 11S and the first electrode 12S is the same as the distance between the first electrode 11S and the first electrode 13S, and the distance between the second electrode 21S and the second electrode 22S is the same as the distance between the second electrode 21S and the second electrode 23S. The distance between the first electrode 14S and the first electrode 15S is the same as the distance between the first electrode 14S and the first electrode 16S, and the distance between the second electrode 24S and the second electrode 25S is the same as the distance between the second electrode 24S and the second electrode 26S. In a plan view, the first electrode 14S and the first electrode 11S, the first electrode 15S and the first electrode 12S, the first electrode 16S and the first electrode 13S, the second electrode 24S and the second electrode 21S, the second electrode 25S and the second electrode 22S, and the second electrode 26S and the second electrode 23S overlap with a straight line (not shown) extending in a direction perpendicular to the extending direction of the first band portion 21B.

The spacer 30 is made of a flexible insulating sheet. Accordingly, examples of a material constituting the insulating sheet include the same material as the material constituting the first insulating sheet 10P and the second insulating sheet 20P. The outer shape of the spacer 30 is substantially the same as that of the second insulating sheet 20P.

The spacer 30 is formed with openings 11H to 16H, 21H to 26H having the same size. The shape of the peripheral edge of each opening is substantially circular, and the diameter of each opening is set to be slightly smaller than the diameter of each electrode of the first electrode sheet 10 and the second electrode sheet 20. The opening 11H is formed at a position corresponding to the first electrode 11F of the first electrode sheet 10, the opening 12H is formed at a position corresponding to the first electrode 12F, the opening 13H is formed at a position corresponding to the first electrode 13F, the opening 14H is formed at a position corresponding to the first electrode 14F, the opening 15H is formed at a position corresponding to the first electrode 15F, and the opening 16H is formed at a position corresponding to the first electrode 16F. The opening 21H is formed at a position corresponding to the second electrode 21F of the first electrode sheet 10, the opening 22H is formed at a position corresponding to the second electrode 22F, the opening 23H is formed at a position corresponding to the second electrode 23F, the opening 24H is formed at a position corresponding to the second electrode 24F, the opening 25H is formed at a position corresponding to the second electrode 25F, and the opening 26H is formed at a position corresponding to the second electrode 26F. When the spacer 30 is overlapped with the first electrode sheet 10 and the second electrode sheet 20 and viewed in a plan view, the openings 11H to 16H of the spacer 30 are located in the inside of the peripheral edge of the first electrode of the corresponding first electrode sheet 10, and in the inside of the peripheral edge of the first electrode of the second electrode sheet 20 corresponding to the first electrode. The openings 21H to 26H are located in the inside of the peripheral edge of the second electrode of the corresponding first electrode sheet 10 and in the inside of the peripheral edge of the second electrode of the second electrode sheet 20 corresponding to the second electrode. For example, the opening 11H is located in the inside of the peripheral edge of the first electrode 11F and the first electrode 11S, and the opening 21H is located in the inside of the peripheral edge of the second electrode 21F and the second electrode 21S.

The spacer 30 is formed with slits which are air vents (not shown), and the openings 11H to 13H and 21H to 23H are spatially connected to each other by the slits, and also spatially connected to the space outside the spacer 30. The openings 14H to 16H, 24H to 26H are spatially connected to each other by the slits, and also spatially connected to the space outside the spacer 30.

Both surfaces of the spacer 30 are coated with an adhesive material (not shown) for adhering to the first electrode sheet 10 and the second electrode sheet 20.

The seating sensor 1 of FIG. 1 is configured by integrating the first electrode sheet 10 and the second electrode sheet 20 having the above configurations via the spacer 30. Therefore, as illustrated in FIG. 1, the seating sensor 1 includes a substantially H-shaped main block 1MB and a substantially rectangular tail block 1TB.

The main block 1MB includes a first band portion 1B, a second band portion 2B, and a third band portion 3B. The first band portion 1B has the same shape as those of the first band portion 11B of the first electrode sheet 10 and the first band portion 21B of the second electrode sheet 20. The second band portion 2B extends in a direction parallel to the extending direction of the first band portion 1B, and has the same shape as those of the second band portion 12B of the first electrode sheet 10 and the second band portion 22B of the second electrode sheet 20. The third band portion 3B extends in a direction perpendicular to the extending direction of the first band portion 1B, and has the same shape as those of the third band portion 13B of the first electrode sheet 10 and the third band portion 23B of the second electrode sheet 20. Accordingly, the first band portion 1B and the second band portion 2B are parallel to each other, one end of the third band portion 3B is connected to the central portion in the extending direction of the first band portion 1B, and the other end of the third band portion 3B is connected to the central portion in the extending direction of the second band portion 2B. Therefore, the seating sensor 1 of the present embodiment is substantially H-shaped as a whole.

In the tail block 1TB, a part of the tail block 10TB of the first electrode sheet 10 is exposed, and a pair of terminals T1, T2 is exposed from this exposed portion. The tail block 1TB is connected to the central portion in the extending direction of the first band portion 1B, and extends in the same direction as the extending direction of the third band portion 3B on the side opposite to the third band portion 3B side. In the tail block 1TB, it is sufficient that at least the pair of terminals T1, T2 is exposed. Therefore, for example, the second insulating sheet 20P does not have to have the tail block 20TB, and the spacer 30 does not have to have a portion corresponding to the tail block 20TB of the second insulating sheet 20P. In such a case, in the tail block 1TB, the exposed portions of the wirings 18A, 19A of the first electrode sheet 10 increase. Therefore, it is preferable to form a protective layer that covers the wirings 18A, 19A exposed on the first electrode sheet 10. Therefore, examples of a material constituting the protective layer include a material constituting the first insulating sheet 10P.

Figure 3:
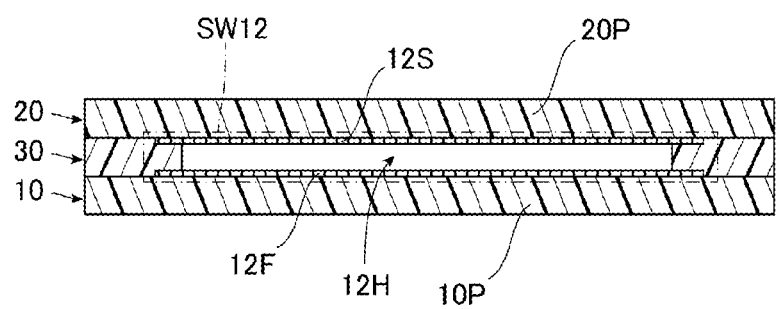
FIG. 3 is a cross-sectional view taken along a line III-III of FIG. 1.

FIG. 3 is a cross-sectional view taken along a line III III of FIG. 1. As illustrated in FIG. 3, the first electrode sheet 10 and the second electrode sheet 20 are integrated with each other via the spacer 30, so that the first electrode 12F and the first electrode 12S face each other at a predetermined interval at the opening 12H to form a first pressure-sensitive switch SW12. As similar to this, although not particularly shown, the first electrode 11F and the first electrode 11S face each other at a predetermined interval at the opening 11H to form a first pressure-sensitive switch SW11, and the first electrode 13F and the first electrode 13S face each other at a predetermined interval at the opening 13H to form a first pressure-sensitive switch SW13. As similar to this, the first electrodes 14F to 16F and the first electrodes 14S to 16S corresponding to the first electrodes 14F to 16F respectively face each other at predetermined intervals at openings 14H to 16H corresponding to the first electrodes 14F to 16F to form first pressure-sensitive switches SW14 to SW16. As similar to this, the second electrodes 21F to 26F and the second electrodes 21S to 26S corresponding to the second electrodes 21F to 26F respectively face each other at predetermined intervals at openings 21H to 26H corresponding to the second electrodes 21F to 26F to form second pressure-sensitive switches SW21 to SW26.

When a load is applied to the pressure-sensitive switch, the two electrodes in each pressure-sensitive switch come into contact with each other. The pressure-sensitive switch of which the two electrodes as described above are in contact with each other is turned on. At this time, part of the air in the opening of the spacer 30 moves through the slit and is discharged to the outside.

As illustrated in FIG. 1, the main block 1MB includes a plurality of such pressure-sensitive switches. Here, the pressure-sensitive switches included in the first band portion 1B are the first pressure-sensitive switch group, and the first pressure-sensitive switch group includes at least six pressure-sensitive switches SW11 to SW13, SW21 to SW23 arranged along the extending direction of the first band portion 1B. The first pressure-sensitive switch group includes the first pressure-sensitive switches SW11 to SW13 arranged on one side of the center of the first band portion 1B in the extending direction and the second pressure-sensitive switches SW21 to SW23 arranged on the other side.

The pressure-sensitive switch pair consisting of the first pressure-sensitive switch SW11 and the second pressure-sensitive switch SW21 is the first pressure-sensitive switch pair. The first pressure-sensitive switch SW13, which is another first pressure-sensitive switch in the first pressure-sensitive switch group, and the second pressure-sensitive switch SW22, which is another second pressure-sensitive switch, are located between the first pressure-sensitive switch SW11 and the second pressure-sensitive switch SW21 as the first pressure-sensitive switch pair. The pressure-sensitive switch pair consisting of the first pressure-sensitive switch SW12 and the second pressure-sensitive switch SW22 is the second pressure-sensitive switch pair. The first pressure-sensitive switch SW12 in the second pressure-sensitive switch pair is the farthest from the second pressure-sensitive switches SW21 to SW23 among the first pressure-sensitive switches SW11 to SW13. On the other hand, the second pressure-sensitive switch SW22 in the second pressure-sensitive switch pair is the closest to the first pressure-sensitive switches SW11 to SW13 among the second pressure-sensitive switches SW21 to SW23. The pressure-sensitive switch pair consisting of the first pressure-sensitive switch SW13 and the second pressure-sensitive switch SW23 is the third pressure-sensitive switch pair. The second pressure-sensitive switch SW23 in the third pressure-sensitive switch pair is the farthest from the first pressure-sensitive switches SW11 to SW13 among the second pressure-sensitive switches SW21 to SW23. On the other hand, the first pressure-sensitive switch SW13 in the third pressure-sensitive switch pair is the closest to the second pressure-sensitive switches SW21 to SW23 among the first pressure-sensitive switches SW11 to SW13. The first pressure-sensitive switch group includes the first pressure-sensitive switch pair, the second pressure-sensitive switch pair, and the third pressure-sensitive switch pair.

The pressure-sensitive switches included in the second band portion 2B are the second pressure-sensitive switch group, and the second pressure-sensitive switch group includes at least six pressure-sensitive switches SW14 to SW16, SW24 to SW26 arranged along the extending direction of the second band portion 2B. The second pressure-sensitive switch group includes the first pressure-sensitive switches SW14 to SW16 arranged on one side of the center of the second band portion 2B in the extending direction and the second pressure-sensitive switches SW24 to SW26 arranged on the other side.

The pressure-sensitive switch pair consisting of the first pressure-sensitive switch SW14 and the second pressure-sensitive switch SW24 is the fourth pressure-sensitive switch pair. The first pressure-sensitive switch SW16, which is another first pressure-sensitive switch in the second pressure-sensitive switch group, and the second pressure-sensitive switch SW25, which is another second pressure-sensitive switch, are located between the first pressure-sensitive switch SW14 and the second pressure-sensitive switch SW24 in the fourth pressure-sensitive switch pair. The pressure-sensitive switch pair consisting of the first pressure-sensitive switch SW15 and the second pressure-sensitive switch SW25 is the fifth pressure-sensitive switch pair. The first pressure-sensitive switch SW15 in the fifth pressure-sensitive switch pair is the farthest from the second pressure-sensitive switches SW24 to SW26 among the first pressure-sensitive switches SW14 to SW16. On the other hand, the second pressure-sensitive switch SW25 in the fifth pressure-sensitive switch pair is the closest to the first pressure-sensitive switches SW14 to SW16 among the second pressure-sensitive switches SW24 to SW26. The pressure-sensitive switch pair consisting of the first pressure-sensitive switch SW16 and the second pressure-sensitive switch SW26 is the sixth pressure-sensitive switch pair. The second pressure-sensitive switch SW26 in the sixth pressure-sensitive switch pair is the farthest from the first pressure-sensitive switches SW14 to SW16 among the second pressure-sensitive switches SW24 to SW26. On the other hand, the first pressure-sensitive switch SW16 in the sixth pressure-sensitive switch pair is the closest to the second pressure-sensitive switches SW24 to SW26 among the first pressure-sensitive switches SW14 to SW16. Accordingly, the second pressure-sensitive switch group includes the fourth pressure-sensitive switch pair, the fifth pressure-sensitive switch pair, and the sixth pressure-sensitive switch pair. The fourth pressure-sensitive switch pair of the second pressure-sensitive switch group corresponds to the first pressure-sensitive switch pair of the first pressure-sensitive switch group, the fifth pressure-sensitive switch pair of the second pressure-sensitive switch group corresponds to the second pressure-sensitive switch pair of the first pressure-sensitive switch group, and the sixth pressure-sensitive switch pair of the second pressure-sensitive switch group corresponds to the third pressure-sensitive switch pair of the first pressure-sensitive switch group.

With respect to a straight line passing through the center in the extending direction of the first band portion 1B and perpendicular to the extending direction of the first band portion 1B, the first pressure-sensitive switch SW11 and the second pressure-sensitive switch SW21 are arranged at symmetrical positions, the first pressure-sensitive switch SW12 and the second pressure-sensitive switch SW23 are arranged at symmetrical positions, and the first pressure-sensitive switch SW13 and the second pressure-sensitive switch SW22 are arranged at symmetrical positions. With respect to a straight line passing through the center in the extending direction of the second band portion 2B and perpendicular to the extending direction of the second band portion 2B, the first pressure-sensitive switch SW14 and the second pressure-sensitive switch SW24 are arranged at symmetrical positions, the first pressure-sensitive switch SW15 and the second pressure-sensitive switch SW26 are arranged at symmetrical positions, and the first pressure-sensitive switch SW16 and the second pressure-sensitive switch SW25 are arranged at symmetrical positions. The first pressure-sensitive switches SW11 to SW13 and the second pressure-sensitive switches SW21 to SW23 overlap with a straight line (not shown) extending in the extending direction of the first band portion 1B in a plan view, and the first pressure-sensitive switches SW14 to SW16 and the second pressure-sensitive switches SW24 to SW26 overlap with a straight line (not shown) extending in the extending direction of the second band portion 2B in a plan view. The distance between the first pressure-sensitive switch SW11 and the first pressure-sensitive switch SW12 is the same as the distance between the first pressure-sensitive switch SW11 and the first pressure-sensitive switch SW13, and the distance between the second pressure-sensitive switch SW21 and the second pressure-sensitive switch SW22 is the same as the distance between the second pressure-sensitive switch SW21 and the second pressure-sensitive switch SW23. The distance between the first pressure-sensitive switch SW14 and the first pressure-sensitive switch SW15 is the same as the distance between the first pressure-sensitive switch SW14 and the first pressure-sensitive switch SW16, and the distance between the second pressure-sensitive switch SW24 and the second pressure-sensitive switch SW25 is the same as the distance between the second pressure-sensitive switch SW24 and the second pressure-sensitive switch SW26. It is preferable that these distances are 15 mm or more and 50 mm or less from the viewpoint of appropriately detecting side sitting. In a plan view, the first pressure-sensitive switch SW14 and the first pressure-sensitive switch SW11, the first pressure-sensitive switch SW15 and the first pressure-sensitive switch SW12, the first pressure-sensitive switch SW16 and the first pressure-sensitive switch SW13, the second pressure-sensitive switch SW24 and the second pressure-sensitive switch SW21, the second pressure-sensitive switch SW25 and the second pressure-sensitive switch SW22, and the second pressure-sensitive switch SW26 and the second pressure-sensitive switch SW23 overlap with a straight line (not shown) extending in the direction perpendicular to the extending direction of the first band portion 1B, respectively. The distance between the first pressure-sensitive switch SW11 and the second pressure-sensitive switch SW21 in the first pressure-sensitive switch pair, and the distance between the first pressure-sensitive switch SW12 and the second pressure-sensitive switch SW22 in the second pressure-sensitive switch pair, and the distance between the first pressure-sensitive switch SW13 and the second pressure-sensitive switch SW23 in the third pressure-sensitive switch pair are the same. The distance between the first pressure-sensitive switch SW14 and the second pressure-sensitive switch SW24 in the fourth pressure-sensitive switch pair, and the distance between the first pressure-sensitive switch SW15 and the second pressure-sensitive switch SW25 in the fifth pressure-sensitive switch pair, and the distance between the first pressure-sensitive switch SW16 and the second pressure-sensitive switch SW26 in the sixth pressure-sensitive switch pair are the same. It is preferable that the distance from the center of the first band portion 1B to the center of the second band portion 2B is 50 mm or more and less than 100 mm from the viewpoint of appropriately detecting front sitting.

Figure 4:
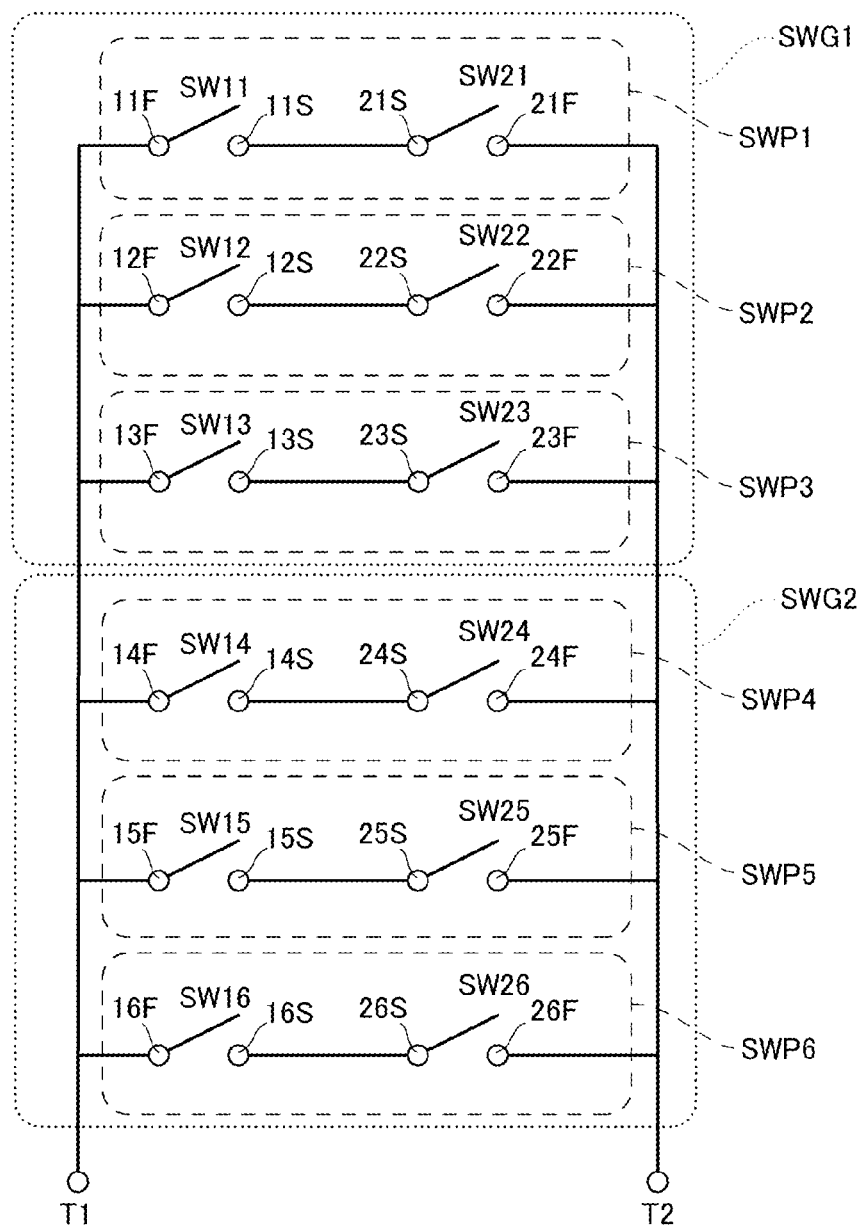
FIG. 4 is a diagram illustrating an equivalent circuit of the seating sensor of FIG. 1.

FIG. 4 is a diagram illustrating an equivalent circuit of the seating sensor of FIG. 1. As illustrated in FIG. 4, in the first pressure-sensitive switch group SWG1, the first pressure-sensitive switch SW11 and the second pressure-sensitive switch SW21, which are the first pressure-sensitive switch pair SWP1, are connected in series, the first pressure-sensitive switch SW12 and the second pressure-sensitive switch SW22, which are the second pressure-sensitive switch pair SWP2, are connected in series, and the first pressure-sensitive switch SW13 and the second pressure-sensitive switch SW23, which are the third pressure-sensitive switch pair SWP3, are connected in series. In the second pressure-sensitive switch group SWG2, the first pressure-sensitive switch SW14 and the second pressure-sensitive switch SW24, which are the fourth pressure-sensitive switch pair SWP4, are connected in series, the first pressure-sensitive switch SW15 and the second pressure-sensitive switch SW25, which are the fifth pressure-sensitive switch pair SWP5, are connected in series, and the first pressure-sensitive switch SW16 and the second pressure-sensitive switch SW26, which are the sixth pressure-sensitive switch pair SWP6, are connected in series. The pressure-sensitive switch pairs SWP1 to SWP6 are electrically connected in parallel with each other. Therefore, a pair of terminals T1, T2 of the seating sensor 1 is electrically connected when both the first pressure-sensitive switch and the second pressure-sensitive switch in at least one pressure-sensitive switch pair of the first pressure-sensitive switch group SWG1 or both the first pressure-sensitive switch and the second pressure-sensitive switch in at least one pressure-sensitive switch pair of the second pressure-sensitive switch group SWG2 are turned on.

Figure 5:
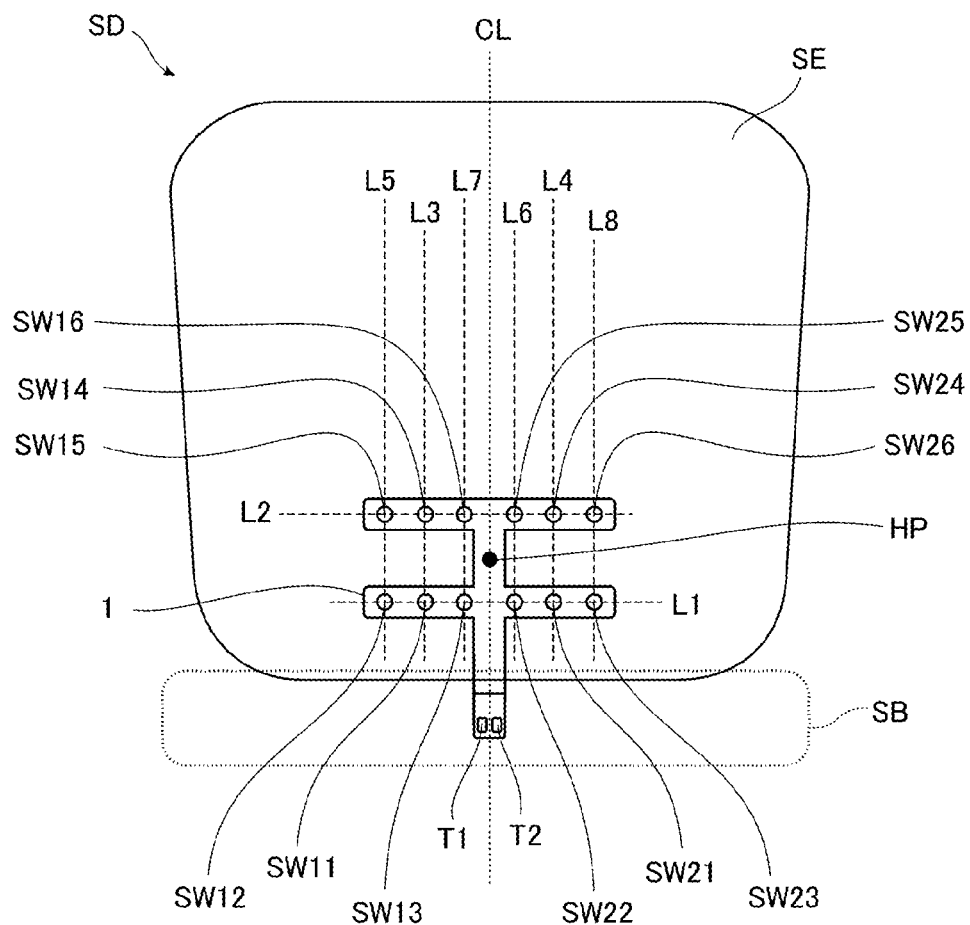
FIG. 5 is a diagram illustrating an example of a situation where the seating sensor of FIG. 1 is arranged in a seat device.
Figure 6:
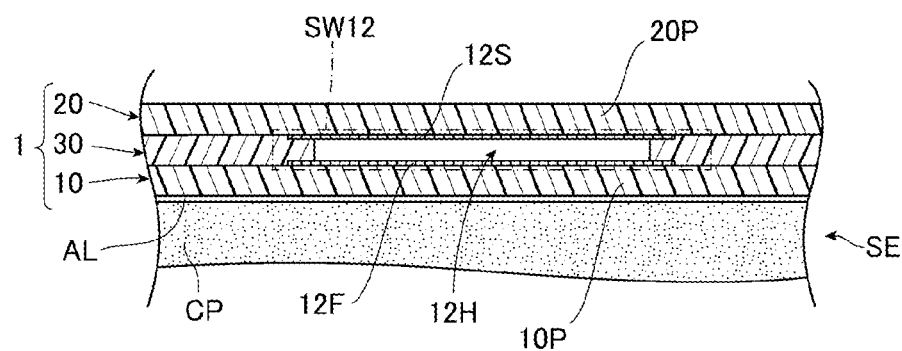
FIG. 6 is a diagram illustrating a part of a vertical cross section of a seat in the seat device of FIG. 5.

FIG. 5 is a diagram illustrating an example of situation where the seating sensor 1 is arranged in the seat device, and FIG. 6 is a diagram illustrating a part of a vertical cross section of the seat in the seat device of FIG. 5. As illustrated in FIG. 5, a seat device SD of the present embodiment has a seat SE and a backrest SB. As illustrated in FIG. 6, the seating sensor 1 is fixed to an upper surface of a cushion pad CP of the seat SE via an adhesive layer AL. The cushion pad CP to which the seating sensor 1 is attached is surrounded by a skin (not shown). Therefore, in the present embodiment, the seating sensor 1 is located between the cushion pad CP of the seat SE and the skin (not shown). In the present embodiment, the first electrode sheet 10 side of the seating sensor 1 is fixed to the surface of the cushion pad CP by the adhesive layer AL, but the second electrode sheet 20 side may be fixed to the surface of the cushion pad CP by the adhesive layer AL. Examples of the material constituting the cushion pad CP include urethane foam. As illustrated in FIG. 5, the seating sensor 1 is arranged so that the pressure-sensitive switch is located in front of the backrest SB, the longitudinal direction of the third band portion 3B extends in the front-rear direction of the seat SE, and the longitudinal direction of the first band portion 1B and the second band portion 2B extends along the left-right direction of the seat SE. FIG. 5 illustrates a situation where the seating sensor 1 is arranged in the seat SE so that, when the seating sensor 1 is viewed in a plan view, a center line CL in the width direction of the seat SE passes through the center in the longitudinal direction of the first band portion 1B and the center in the longitudinal direction of the second band portion 2B, and the longitudinal direction of the first band portion 1B and the second band portion 2B extends along the direction perpendicular to the center line CL of the seat SE. In the situation illustrated in FIG. 5, the pressure-sensitive switches SW11 to SW13, SW21 to SW23 included in the first band portion 1B are located behind the hip point HP of the seat SE, and the pressure-sensitive switches SW14 to SW16 and SW24 to SW26 included in the second band portion 2B are located in front of the hip point HP of the seat SE. Note that the hip point HP is a position of the hip point in a three-dimensional sitting mannequin when the three-dimensional sitting mannequin based on JIS-D4607 is seated on the seat SE.

Here, as illustrated in FIG. 1, when the seating sensor 1 is viewed in a plan view, at least six pressure-sensitive switches SW11 to SW13 and SW21 to SW23 in the first pressure-sensitive switch group SWG1 illustrated in FIG. 4 are arranged in the first band portion 1B along the extending direction of the first band portion 1B. At least six pressure-sensitive switches SW14 to SW16, SW24 to SW26 in the second pressure-sensitive switch group SWG2 are arranged in the second band portion 2B along the extending direction of the second band portion 2B. Accordingly, at least six pressure-sensitive switches SW11 to SW13, SW21 to SW23 in the first pressure-sensitive switch group SWG1 are arranged along the left-right direction of the seat SE. At least six pressure-sensitive switches SW14 to SW16, SW24 to SW26 in the second pressure-sensitive switch group SWG2 are arranged along the left-right direction of the seat SE. As illustrated in FIG. 5, the first pressure-sensitive switches SW11 to SW16 are located on one side of the center line CL of the seat SE, and the second pressure-sensitive switches SW21 to SW26 are located on the other side of the center line CL of the seat SE. Accordingly, the center line CL of the seat SE is located between the first pressure-sensitive switch and the second pressure-sensitive switch in each pressure-sensitive switch pair.

In the present embodiment, seating is detected by a vehicle control unit (not shown) electrically connected to the pair of terminals T1, T2. The vehicle control unit determines that an occupant is not seated in the seat SE when the pair of terminals T1, T2 are electrically disconnected, and determines that an occupant is seated in the seat SE when the pair of terminals T1, T2 are electrically connected. Accordingly, in the seating sensor 1 of the present embodiment, seating is detected when both the first pressure-sensitive switch and the second pressure-sensitive switch in at least one of the first to third pressure-sensitive switch pair of the first pressure-sensitive switch group SWG1 or both the first pressure-sensitive switch and the second pressure-sensitive switch in at least one of the fourth to sixth pressure-sensitive switch pair of the second pressure-sensitive switch group SWG2 are turned on.

As described above, the seating sensor 1 of the present embodiment includes a first pressure-sensitive switch group SWG1 composed of at least six pressure-sensitive switches SW11 to SW13, SW21 to SW23 arranged along the left-right direction of the seat SE. The three second pressure-sensitive switches SW21 to SW23 in the first pressure-sensitive switch group SWG1 are located on one side of the seat SE in the left-right direction from the three first pressure-sensitive switches SW11 to SW13 in the first pressure-sensitive switch group SWG1. The first pressure-sensitive switch group SWG1 includes a first pressure-sensitive switch pair SWP1, a second pressure-sensitive switch pair SWP2, and a third pressure-sensitive switch pair SWP3. The first pressure-sensitive switch pair SWP1 includes the first pressure-sensitive switch SW11 and the second pressure-sensitive switch SW21. The first pressure-sensitive switch SW13 and the second pressure-sensitive switch SW22 are located between the first pressure-sensitive switch SW11 and the second pressure-sensitive switch SW21 in the first pressure-sensitive switch pair SWP1. The second pressure-sensitive switch pair SWP2 includes the first pressure-sensitive switch SW12 and the second pressure-sensitive switch SW22. The first pressure-sensitive switch SW12 in the second pressure-sensitive switch pair SWP2 is the farthest from the second pressure-sensitive switches SW21 to SW23 among the first pressure-sensitive switches SW11 to SW13. The second pressure-sensitive switch SW22 in the second pressure-sensitive switch pair SWP2 is the closest to the first pressure-sensitive switches SW11 to SW13 among the second pressure-sensitive switches SW21 to SW23. The third pressure-sensitive switch pair SWP3 includes the first pressure-sensitive switch SW13 and the second pressure-sensitive switch SW23. The second pressure-sensitive switch SW23 in the third pressure-sensitive switch pair SWP3 is the farthest from the first pressure-sensitive switches SW11 to SW13 among the second pressure-sensitive switches SW21 to SW23. The first pressure-sensitive switch SW13 in the third pressure-sensitive switch pair SWP3 is the closest to the second pressure-sensitive switches SW21 to SW23 among the first pressure-sensitive switches SW11 to SW13. In the seating sensor 1 of the present embodiment, seating is detected when both the first pressure-sensitive switch and the second pressure-sensitive switch in at least one of the first to third pressure-sensitive switch pairs SWP1 to SWP3 are turned on.

Figure 7:
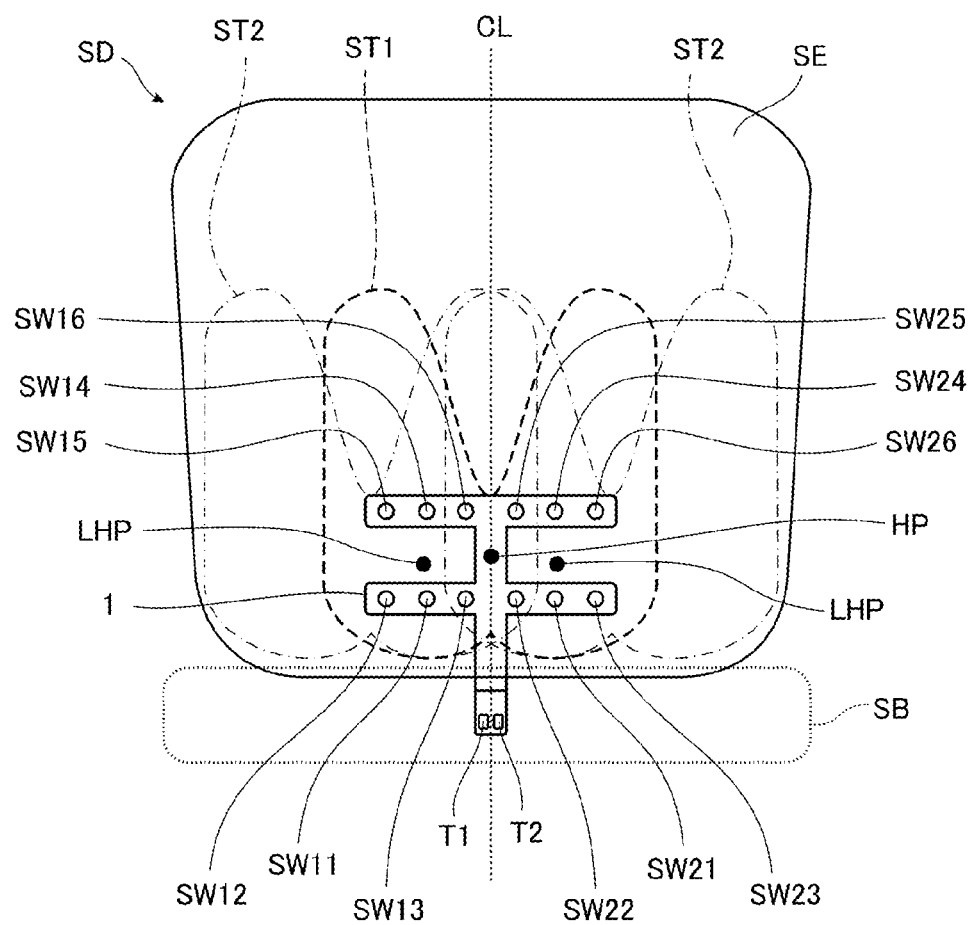
FIG. 7 is a diagram illustrating an example of a region in which a load is applied to the seat when an occupant is seated.

In the seating sensor 1 of the present embodiment, the second pressure-sensitive switch pair SWP2 is located on one side of the seat in the left-right direction of the seat SE from the first pressure-sensitive switch pair SWP1, and the third pressure-sensitive switch pair SWP3 is located on another side in the left-right direction of the seat SE from the first pressure-sensitive switch pair SWP1. As illustrated in FIG. 5, the seating sensor 1 of the present embodiment is arranged so that the center of the seat SE in the left-right direction is located between the first pressure-sensitive switch SW11 and the second pressure-sensitive switch SW21 in the first pressure-sensitive switch pair SWP1. FIG. 7 is a diagram illustrating an example of a region in which a load is applied to the seat SE when an occupant is seated. In FIG. 7, a region ST1 where a load is applied to the seat SE when an occupant is seated in normal sitting is shown by a broken line, and a region ST2 where a load is applied to the seat SE when an occupant is seated in side sitting is shown by a chain line. Note that these regions ST1, ST2 are regions where a load is applied to the seat SE when an adult woman weighing approximately 50 kg is seated. Since the seating sensor 1 of the present embodiment includes the first pressure-sensitive switch group SWG1 arranged as described above, as illustrated in FIG. 7, at least the first pressure-sensitive switch SW11 and the second pressure-sensitive switch SW21 in the first pressure-sensitive switch pair SWP1 can be located in the region ST1. Therefore, when an occupant is seated in normal sitting, at least both the first pressure-sensitive switch SW11 and the second pressure-sensitive switch SW21 in the first pressure-sensitive switch pair SWP1 are turned on. At least the first pressure-sensitive switch SW12 and the second pressure-sensitive switch SW22 in the second pressure-sensitive switch pair SWP2 or the first pressure-sensitive switch SW13 and the second pressure-sensitive switch SW23 in the third pressure-sensitive switch pair SWP3 can be located in the region ST2. Therefore, when an occupant is seated in side sitting, at least both the first pressure-sensitive switch SW12 and the second pressure-sensitive switch SW22 in the second pressure-sensitive switch pair SWP2 or both the first pressure-sensitive switch SW13 and the second pressure-sensitive switch SW23 in the third pressure-sensitive switch pair SWP3 are turned on. In the seating sensor 1 of the present embodiment, at least six pressure-sensitive switches SW11 to SW13 and SW21 to SW23 are arranged along the left-right direction of the seat SE. Accordingly, according to the seating sensor 1 of the present embodiment, seating of an occupant can be appropriately detected in all the patterns of normal sitting and left and right side sitting.

In the seating sensor 1 of the present embodiment, the pressure-sensitive switch located at one end of the seat SE in the left-right direction is the first pressure-sensitive switch SW12 in the second pressure-sensitive switch pair SWP2. The pressure-sensitive switch located at the other end of the seat SE in the left-right direction is the second pressure-sensitive switch SW23 in the third pressure-sensitive switch pair SWP3. Therefore, according to the seating sensor of the present embodiment, luggage such as a child seat in which loads are applied on both ends in the left-right direction of the seat SE is placed on the seat SE and both the pressure-sensitive switches located at both ends of the seat SE in the left-right direction are turned on, seating is not detected. Accordingly, according to the seating sensor 1 of the present embodiment, it is possible to suppress false detection due to such luggage being placed on the seat SE.

In the seating sensor 1 of the present embodiment, when the seat SE is arranged so that the center of the seat SE in the left-right direction is located between the first pressure-sensitive switch SW11 and the second pressure-sensitive switch SW21 in the first pressure-sensitive switch pair SWP1, the two pressure-sensitive switches near the center of the seat SE in the left-right direction are the first pressure-sensitive switch SW13 and the second pressure-sensitive switch SW22, and are pressure-sensitive switches in the pressure-sensitive switch pairs different from each other. Therefore, seating is not detected even when luggage that applies a load in the central portion of the seat SE in the left-right direction is placed on the seat SE and the first pressure-sensitive switch SW13 and the second pressure-sensitive switch SW22 that are two pressure-sensitive switches close to the center of the seat SE in the left-right direction are turned on. Two pressure-sensitive switches included in another pressure-sensitive switch pair are located between the first pressure-sensitive switch and the second pressure-sensitive switch in each pressure-sensitive switch pair. Therefore, in the seating sensor 1 of the present embodiment, as compared with a case where no other pressure-sensitive switch is located between the first pressure-sensitive switch and the second pressure-sensitive switch in the pressure-sensitive switch pair, or a case where another pressure-sensitive switch is located between the first pressure-sensitive switch and the second pressure-sensitive switch in the pressure-sensitive switch pair, the first pressure-sensitive switch and the second pressure-sensitive switch in each pressure-sensitive switch pair can be separated from each other. Therefore, according to the seating sensor 1 of the present embodiment, when luggage is placed on the seat SE, it is possible to make it difficult for the pressure-sensitive switch pair to be located in the region where a load of the luggage is applied, and false detection due to larger luggage being placed in the seat SE can be suppressed. Accordingly, according to the seating sensor 1 of the present embodiment, it is possible to appropriately detect seating and suppress false detection of luggage as compared with the above case.

In the seating sensor 1 of the present embodiment, the pressure-sensitive switches SW11 to SW13, SW21 to SW23 of the first pressure-sensitive switch group SWG1 are located behind the hip point HP of the seat SE.

When an occupant is seated, a maximum load or a load close to the maximum load is applied to a portion of the seat SE corresponding to the roughly central portion of the right buttock and a portion corresponding to the roughly central portion of the left buttock. FIG. 7 illustrates two portions LHP where such a large load is applied when an adult is seated in normal sitting. Note that, for this portion LHP, a case of an adult woman weighing approximately 50 kg is assumed. When an adult is seated in normal sitting, the position in the front-rear direction of this portion LHP tends to be at or near a position in the front-rear direction of the hip point HP. On the other hand, when a child is seated so that the back is attached to the backrest SB, the buttocks of the child are smaller than the buttocks of the adult, so the position in the front-rear direction of the portion where a large load is applied tends to be located behind the hip point HP. Therefore, with the configuration as described above, as compared with the case where each of the pressure-sensitive switches SW11 to SW13, SW21 to SW23 of the first pressure-sensitive switch group SWG1 is located in front of the hip point HP of the seat SE, it is possible to make the each of the pressure-sensitive switches SW11 to SW13, SW21 to SW23 close to the portion where a large load is applied in a case where a child is seated as described above. Therefore, according to the seating sensor 1 of the present embodiment, seating of a child can be appropriately detected.

Note that, from the viewpoint of detecting the seating of children more appropriately while detecting the seating of adults, it is preferable that the distance in the front-rear direction of the seat SE between each of the pressure-sensitive switches SW11 to SW13, SW21 to SW23 of the first pressure-sensitive switch group SWG1 and the hip point HP exceeds 0 mm and is 40 mm or less. Note that this distance is the distance between the center of the pressure-sensitive switch and the hip point HP in the front-rear direction of the seat SE. With this configuration, it is possible to prevent the pressure-sensitive switches in the first pressure-sensitive switch group SWG1 from being significantly separated from a portion where a large load is applied in a case of normal sitting by an adult, while making the pressure-sensitive switch close to the portion LHP where a large load is applied in a case where a child is seated in normal sitting. Therefore, according to this seating sensor, it is possible to more appropriately detect seating of a child while detecting seating of an adult. Note that the distance preferably exceeds 0 mm since the load applied is larger in the case of an adult than that in the case of a child so that the region where the load is applied is larger, and therefore, the switch can be turned on even if the distance exceeds 0 mm. Further, if it exceeds 40 mm, the pressure-sensitive switch may overlap with the backrest SB, and a load may not be applied to the pressure-sensitive switch. Therefore, the pressure-sensitive switch is preferably 40 mm or less. It should be noted that the two portions to which a large load is applied as described above when a child sits tend to be located about 15 mm behind the two portions LHP where a large load is applied when an adult sits. In addition, the position of the portion to which such a large load is applied varies regardless of whether it is an adult or a child. Therefore, from the viewpoint of more appropriately detecting the seating of children of about 10 years old while detecting the seating of adults, it is preferable that the above distance is 10 mm or more and 40 mm or less, and more preferably, 10 mm or more and 30 mm or less in consideration of the variation in the position of the portion where a large load is applied.

From the viewpoint of more appropriately detecting the seating of children and adults, it is preferable that the distance between the first pressure-sensitive switch and the second pressure-sensitive switch in each of the pressure-sensitive switch pairs SWP1 to SWP3 of the first pressure-sensitive switch group SWG1 is 75 mm or more and less than 120 mm. Note that this distance is the distance between the center of the first pressure-sensitive switch and the center of the second pressure-sensitive switch. As described above, when an occupant is seated, a maximum load or a load close to the maximum load is applied to a portion of the seat SE corresponding to the roughly central portion of the right buttock and a portion corresponding to the roughly central portion of the left buttock. The lower limit of the distance between the two portions where large loads are applied as described above in a case of seating by a child is approximately 75 mm, and the distance between the two portions LHP where a large load is applied in a case of seating by an adult is approximately 120 mm. Therefore, with the configuration as described above, it is possible to prevent the distance between the first pressure-sensitive switch and the second pressure-sensitive switch in each of the pressure-sensitive switch pairs SWP1 to SWP3 from being significantly separated from the distance between the portions LHP where large loads are applied in a case of seating by an adult, while making the distance between the first pressure-sensitive switch and the second pressure-sensitive switch in each pressure-sensitive switch pair close to the distance between the portions where large loads are applied in a case of seating by a child. Therefore, with the configuration as described above, seating of children and seating of adults can be detected more appropriately. With this configuration, it is possible to suppress false detection due to luggage as compared with the case where the distance between the first pressure-sensitive switch and the second pressure-sensitive switch in the pressure-sensitive switch pair is less than 75 mm. Note that the distance is preferably less than 120 mm since the load applied to the seat is larger in the case of an adult than that in the case of a child so that the region where the load is applied is larger, and therefore, the first pressure-sensitive switch and the second pressure-sensitive switch in the pressure-sensitive switch pair can be turned on even if the distance is less than 120 mm. From the viewpoint of more appropriately detecting the seating of children and adults, it is preferable that the distance between two pressure-sensitive switches in the pressure-sensitive switch pairs SWP1 to SWP3 is 80 mm or more and 110 mm or less.

As illustrated in FIG. 5, in the seating sensor 1 of the present embodiment, the pressure-sensitive switches SW11 to SW13, SW21 to SW23 in the first pressure-sensitive switch group SWG1 overlap with a straight line L1 extending in the left-right direction of the seat SE in a plan view. With this configuration, the pressure-sensitive switches SW11 to SW13, SW21 to SW23 in the first pressure-sensitive switch group SWG1 are prevented from shifting in the front-rear direction although being along the left-right direction of the seat SE, as compared with the case where the pressure-sensitive switches SW11 to SW13, SW21 to SW23 in the first pressure-sensitive switch group SWG1 do not overlap with the straight line L1 extending in the left-right direction of the seat SE in a plan view. Therefore, according to the seating sensor 1 of the present embodiment, it is possible to more appropriately detect seating when an occupant is seated on the seat SE in side sitting.

As illustrated in FIGS. 5 and 7, the seating sensor 1 of the present embodiment further includes a second pressure-sensitive switch group SWG2 including at least six pressure-sensitive switches SW14 to SW16, SW24 to SW26 arranged along the left-right direction of the seat SE, in front of the seat SE from the first pressure-sensitive switch group SWG1. The second pressure-sensitive switch group SWG2 includes a fourth pressure-sensitive switch pair SWP4, a fifth pressure-sensitive switch pair SWP5, and a sixth pressure-sensitive switch pair SWP6. The fourth pressure-sensitive switch pair SWP4 corresponds to the first pressure-sensitive switch pair SWP1 of the first pressure-sensitive switch group SWG1, the fifth pressure-sensitive switch pair SWP5 corresponds to the second pressure-sensitive switch pair SWP2 of the first pressure-sensitive switch group SWG1, and the sixth pressure-sensitive switch pair SWP6 corresponds to the third pressure-sensitive switch pair SWP3 of the first pressure-sensitive switch group SWG1. In the seating sensor 1 of the present embodiment, seating is detected when both the first pressure-sensitive switch and the second pressure-sensitive switch in at least one of the first to third pressure-sensitive switch pair SWP1 to SWP3 of the first pressure-sensitive switch group SWG1 or both the first pressure-sensitive switch and the second pressure-sensitive switch in at least one of the fourth to sixth pressure-sensitive switch pair SWP4 to SWP6 of the second pressure-sensitive switch group SWG2 are turned on.

Figure 8:
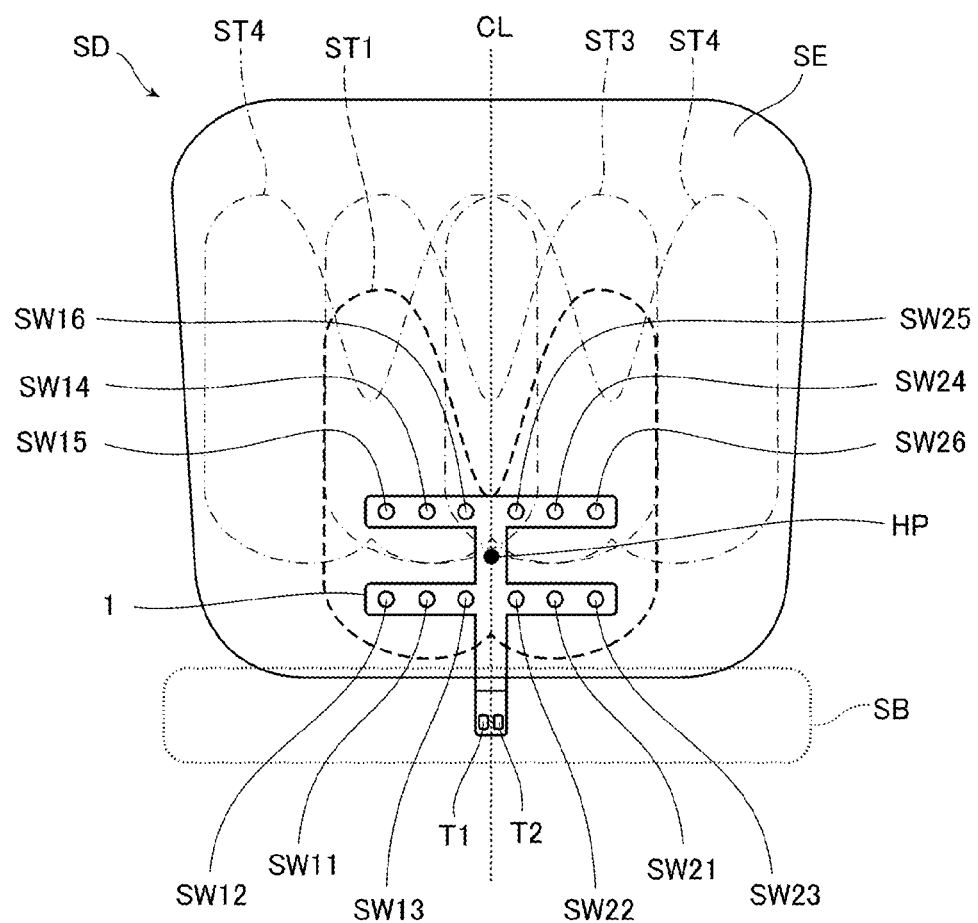
FIG. 8 is a diagram illustrating another example of a region in which a load is applied to the seat when an occupant is seated.

FIG. 8 is a diagram illustrating another example of a region in which a load is applied to the seat SE when an occupant is seated. In FIG. 8, the region ST1 where a load is applied to the seat SE when an adult is seated in normal sitting is shown by a broken line. The region ST3 where a load is applied to the seat SE when an adult is seated in front sitting and the region ST4 where a load is applied to the seat SE when an adult is seated with the buttocks shifted forward and in left-right direction from normal sitting are shown by a chain line. Note that, as described above, the adult here is a woman who weighs approximately 50 kg.

Since the seating sensor 1 of the present embodiment further includes the second pressure-sensitive switch group SWG2, as illustrated in FIG. 8, the first pressure-sensitive switch SW14 and the second pressure-sensitive switch SW24 in at least the fourth pressure-sensitive switch pair SWP4 can be located in the region ST3. Therefore, when an occupant is seated in front sitting, at least both the first pressure-sensitive switch SW14 and the second pressure-sensitive switch SW24 in the fourth pressure-sensitive switch pair SWP4 are turned on. At least the first pressure-sensitive switch SW15 and the second pressure-sensitive switch SW25 in the fifth pressure-sensitive switch pair SWP5 or the first pressure-sensitive switch SW16 and the second pressure-sensitive switch SW26 in the sixth pressure-sensitive switch pair SWP6 can be located in the region ST4. Therefore, when an occupant is seated with the buttocks shifted forward and in left-right direction from normal sitting, at least both the first pressure-sensitive switch SW15 and the second pressure-sensitive switch SW25 in the fifth pressure-sensitive switch pair SWP5 or both the first pressure-sensitive switch SW16 and the second pressure-sensitive switch SW26 in the sixth pressure-sensitive switch pair SWP6 are turned on. Accordingly, according to the seating sensor 1 of the present embodiment, it is possible to appropriately detect seating even when an occupant is seated in front sitting or when an occupant is seated with the buttocks shifted forward and in the left-right direction as compared with the normal sitting.

Note that, from the viewpoint of appropriately detecting seating even when an occupant is seated in front sitting, it is sufficient that the second pressure-sensitive switch group SWG2 includes at least four pressure-sensitive switches arranged along the left-right direction of the seat SE. In this case, seating is detected when both the first pressure-sensitive switch and the second pressure-sensitive switch in at least one of the first to third pressure-sensitive switch pair of the first pressure-sensitive switch group SWG1 or at least two pressure-sensitive switches in the second pressure-sensitive switch group are turned on. With this configuration, when an occupant is seated in front sitting, the occupant's seating can be detected by the pressure-sensitive switch in the second pressure-sensitive switch group. Therefore, with such a seating sensor, seating can be appropriately detected when an occupant is seated in front sitting. Since luggage generally tends to be placed on the seat SE in a state of being close to the backrest SB, a load due to the luggage tends to be applied to the rear side of the seat SE rather than the front side. In the seating sensor as described above, since the second pressure-sensitive switch group is arranged in the front side of the seat SE from the first pressure-sensitive switch group, as compared with the case where the second pressure-sensitive switch group is arranged in the rear side of the seat SE from the first pressure-sensitive switch group, it is possible to suppress a load due to luggage from being applied on the pressure-sensitive switch in the second pressure-sensitive switch group. Therefore, when luggage is placed on the seat SE, a load is less likely to be applied to the second pressure-sensitive switch group than to the first pressure-sensitive switch group. Therefore, for example, even with a configuration of detecting seating when two adjacent pressure-sensitive switches of the second pressure-sensitive switch group are turned on, false detection due to luggage can be suppressed.

As illustrated in FIG. 5, in the seating sensor 1 of the present embodiment, the first pressure-sensitive switch SW14, which is one of the pressure-sensitive switches in the fourth pressure-sensitive switch pair SWP4 of the second pressure-sensitive switch group SWG2, and the first pressure-sensitive switch SW11 in the first pressure-sensitive switch pair SWP1 corresponding to the fourth pressure-sensitive switch pair SWP4 overlap with a straight line L3 extending in the front-rear direction of the seat SE in a plan view. The second pressure-sensitive switch SW24, which is another one of the pressure-sensitive switches in the fourth pressure-sensitive switch pair SWP4 of the second pressure-sensitive switch group SWG2, and the second pressure-sensitive switch SW21 in the first pressure-sensitive switch pair SWP1 corresponding to the fourth pressure-sensitive switch pair SWP4 overlap with a straight line L4 extending in the front-rear direction of the seat SE in a plan view. The first pressure-sensitive switch SW15, which is one of the pressure-sensitive switches in the fifth pressure-sensitive switch pair SWP5, and the first pressure-sensitive switch SW12 in the second pressure-sensitive switch pair SWP2 corresponding to the fifth pressure-sensitive switch pair SWP5 overlap with a straight line L5 extending in the front-rear direction of the seat SE in a plan view. The second pressure-sensitive switch SW25, which is another one of the pressure-sensitive switches in the fifth pressure-sensitive switch pair SWP5, and the second pressure-sensitive switch SW22 corresponding to the fifth pressure-sensitive switch pair SWP5 overlap with a straight line L6 extending in the front-rear direction of the seat SE in a plan view. The first pressure-sensitive switch SW16, which is one of the pressure-sensitive switches in the sixth pressure-sensitive switch pair SWP6, and the first pressure-sensitive switch SW13 in the third pressure-sensitive switch pair SWP3 corresponding to the sixth pressure-sensitive switch pair SWP6 overlap with a straight line L7 extending in the front-rear direction of the seat SE in a plan view. The second pressure-sensitive switch SW26, which is another one of the pressure-sensitive switches in the sixth pressure-sensitive switch pair SWP6, and the second pressure-sensitive switch SW23 corresponding to the sixth pressure-sensitive switch pair SWP6 overlap with a straight line L8 extending in the front-rear direction of the seat SE in a plan view. With this configuration, shifting in the left-right direction of the pressure-sensitive switch pair in the second pressure-sensitive switch group SWG2 with respect to the pressure-sensitive switch pair in the first pressure-sensitive switch group SWG1 is suppressed. Therefore, according to this seating sensor 1 of the present embodiment, it is possible to more appropriately detect seating even when an occupant is seated with the buttocks shifted forward and in the left-right direction as compared with the normal seating.

In the seating sensor 1 of the present embodiment, the distance between the first pressure-sensitive switch SW11 and the second pressure-sensitive switch SW21 in the first pressure-sensitive switch pair SWP1, and the distance between the first pressure-sensitive switch SW12 and the second pressure-sensitive switch SW22 in the second pressure-sensitive switch pair SWP2, and the distance between the first pressure-sensitive switch SW13 and the second pressure-sensitive switch SW23 in the third pressure-sensitive switch pair SWP3 are the same. Therefore, as compared with the case where these distances are different, it is possible to appropriately detect seating of adults and children and further suppress false detection due to small luggage.

As illustrated in FIG. 5, in the seating sensor 1 of the present embodiment, the pressure-sensitive switches SW14 to SW16, SW24 to SW26 in the second pressure-sensitive switch group SWG2 overlap with a straight line L2 extending in the left-right direction of the seat SE in a plan view. With this configuration, the pressure-sensitive switches SW14 to SW16, SW24 to SW26 in the second pressure-sensitive switch group SWG2 are prevented from shifting in the front-rear direction along the left-right direction of the seat SE, as compared with the case where the pressure-sensitive switches SW14 to SW16, SW24 to SW26 in the second pressure-sensitive switch group SWG2 do not overlap with the straight line L2 extending in the left-right direction of the seat SE in a plan view. Therefore, according to the seating sensor 1 of the present embodiment, it is possible to more appropriately detect seating when an occupant is seated on the seat in side sitting.

Further, the seat device SD of the present embodiment includes the seating sensor 1 and a cushion pad CP on which the seating sensor 1 is arranged on a surface, in which the three first pressure-sensitive switches SW11 to SW13 are located on one side from a center in the left-right direction of the seat SE, and the three second pressure-sensitive switches SW21 to SW23 are located on another side of the center in the left-right direction of the seat SE. With such a configuration, in this seat device SD, the first pressure-sensitive switch group SWG1 is prevented from being arranged biased in one side of the seat SE in the left-right direction as compared with a case where the first pressure-sensitive switch and the second pressure-sensitive switch are located on one of sides with respect to the center of the seat in the left-right direction. Accordingly, according to this seat device SD, it is possible to appropriately detect seating of an occupant even when the occupant is seated in the side sitting of being shifted to the right or when the occupant is seated in the side sitting of being shifted to the left.

Although the seating sensor and the seat device of the present invention have been described above with the embodiment as an example, the present invention is not limited to this.

For example, in the above embodiment, the seating sensor 1 includes the first pressure-sensitive switch group SWG1 and the second pressure-sensitive switch group SWG2. However, it is sufficient that the seating sensor 1 includes at least the first pressure-sensitive switch group SWG1. For example, the seating sensor may have a configuration not including the second band portion 2B and the third band portion 3B in the above embodiment.

In the above embodiment, the first pressure-sensitive switch group SWG1 includes six pressure-sensitive switches. However, as long as the first pressure-sensitive switch group SWG1 includes the first pressure-sensitive switch pair SWP1, the second pressure-sensitive switch pair SWP2, and the third pressure-sensitive switch pair SWP3, the first pressure-sensitive switch group SWG1 may include six or more pressure-sensitive switches. For example, the first pressure-sensitive switch group SWG1 may include another pressure-sensitive switch between the first pressure-sensitive switch SW11 and the first pressure-sensitive switch SW12. In this case, the another pressure-sensitive switch may be connected in series with one of the pressure-sensitive switches of any of the first to third pressure-sensitive switch pairs SWP1 to SWP3, and may be connected in parallel with the other pressure-sensitive switch. However, it is preferable that the another pressure-sensitive switch is not connected in this way. When the another pressure-sensitive switch is connected in this way, in the seating sensor, seating is detected when one pressure-sensitive switch is turned on, and the another pressure-sensitive switch or the other pressure-sensitive switch connected in parallel with the another pressure-sensitive switch is turned on. Therefore, as compared with the case where the first pressure-sensitive switch group SWG1 includes another pressure-sensitive switch, it may be difficult to suppress the occurrence of false detection due to small luggage. Accordingly, it is preferable that the another pressure-sensitive switch is not connected as described above. Although the number of pressure-sensitive switch pairs may be four or more, since the seating sensor 1 becomes large and detection of side sitting is already achieved by the first to third pressure-sensitive switch pairs SWP1 to SWP3, the number of pressure-sensitive switch pairs is preferably three, and the first pressure-sensitive switch group SWG1 preferably includes six pressure-sensitive switches.

In the above embodiment, the second pressure-sensitive switch group SWG2 includes six pressure-sensitive switches. However, the number of pressure-sensitive switches in the second pressure-sensitive switch group SWG2 is not limited, may be different from the number of pressure-sensitive switches in the first pressure-sensitive switch group SWG1, and may be, for example, four or seven or more. Note that, as described above, a load due to luggage tends to be applied to the rear side of the seat SE rather than the front side. Therefore, from the viewpoint of suppressing false detection due to luggage and making the configuration simple, it is preferable that the number of pressure-sensitive switches in the second pressure-sensitive switch group SWG2 is equal to or less than the number of pressure-sensitive switches in the first pressure-sensitive switch group SWG1. From the viewpoint of appropriately detecting seating of an occupant while suppressing false detection due to luggage, it is preferable that the number of pressure-sensitive switches in the second pressure-sensitive switch group SWG2 is set to two or more, and seating is detected when at least two of the pressure-sensitive switches in the second pressure-sensitive switch group SWG2 are turned on, and it is more preferable that the number of pressure-sensitive switches in the second pressure-sensitive switch group SWG2 is four or more. For example, a case where the second pressure-sensitive switch group SWG2 includes four pressure-sensitive switches arranged along the left-right direction of the seat SE will be described. In this case, for example, these pressure-sensitive switches of the second pressure-sensitive switch group SWG2 are located on the left side of the pressure-sensitive switch located on the rightmost side of the first pressure-sensitive switch group SWG1 in the left-right direction of the seat SE, and are located on the right side of the pressure-sensitive switch located on the leftmost side in the first pressure-sensitive switch group SWG1. Of the four pressure-sensitive switches in the second pressure-sensitive switch group SWG2, the two pressure-sensitive switches on the right side are connected in parallel to each other, and the two pressure-sensitive switches on the left side are connected in parallel to each other. Then, the two pressure-sensitive switches on the right side and the two pressure-sensitive switches on the left side are connected in series with each other. By such connection, of the four pressure-sensitive switches in the second pressure-sensitive switch group SWG2, seating is detected when at least one of the two pressure-sensitive switches on the right side and at least one of the two pressure-sensitive switches on the left side are turned on. In other words, the second pressure-sensitive switch group SWG2 includes two pressure-sensitive switch pairs each including a predetermined pressure-sensitive switch and a specific pressure-sensitive switch located on one side of the seat SE in the left-right direction from the predetermined pressure-sensitive switch. One pressure-sensitive switch pair is located on one side of the seat SE in the left-right direction from the other pressure-sensitive switch pair, and seating is detected when at least one pressure-sensitive switch in one pressure-sensitive switch pair and at least one pressure-sensitive switch in the other pressure-sensitive switch pair is turned on. Alternatively, of the four pressure-sensitive switches in the second pressure-sensitive switch group SWG2, the rightmost pressure-sensitive switch and the pressure-sensitive switch located next to the leftmost pressure-sensitive switch may be connected in series with each other, and the leftmost pressure-sensitive switch and the pressure-sensitive switch located next to the rightmost pressure-sensitive switch may be connected in series with each other. In this case, two pressure-sensitive switch pairs each including two pressure-sensitive switches connected in series are configured, and these two pressure-sensitive switch pairs are connected in parallel with each other. With such connection, seating is detected when the two pressure-sensitive switches in at least one of the pressure-sensitive switch pairs are turned on. In other words, the second pressure-sensitive switch group SWG2 includes two pressure-sensitive switch pairs each including a predetermined pressure-sensitive switch and a specific pressure-sensitive switch located on one side of the seat SE in the left-right direction from the predetermined pressure-sensitive switch. One pressure-sensitive switch in each of the pressure-sensitive switch pairs is located between two pressure-sensitive switches in the other pressure-sensitive switch pair in the left-right direction of the seat SE, and seating is detected when two pressure-sensitive switches in at least one of the pressure-sensitive switch pairs are turned on. With such a configuration, it is possible to appropriately detect seating of an occupant while suppressing false detection due to luggage. It is most preferable that the number of pressure-sensitive switches in the second pressure-sensitive switch group SWG2 is the same as the number of pressure-sensitive switches in the first pressure-sensitive switch group SWG1, the pressure-sensitive switches in the second pressure-sensitive switch group SWG2 and the pressure-sensitive switches in the first pressure-sensitive switch group SWG1 have a one-to-one correspondence with each other, and the pressure-sensitive switches corresponding to each other overlap with a straight line extending in the front-rear direction of the seat SE in a plan view.

In the above embodiment, the first pressure-sensitive switch group SWG1 is located behind the hip point HP of the seat SE, and the second pressure-sensitive switch group SWG2 is located in front of the hip point HP of the seat SE. However, the first pressure-sensitive switch group SWG1 may be located in front of the hip point HP of the seat SE, and the first pressure-sensitive switch group SWG1 and the second pressure-sensitive switch group SWG2 may be located behind the hip point HP of the seat SE.

In the above embodiment, with reference to a straight line passing through the center in the extending direction of the first band portion 1B and perpendicular to the extending direction of the first band portion 1B, the first pressure-sensitive switches SW11 to SW13 and the second pressure-sensitive switches SW21 to SW23 in the first pressure-sensitive switch group SWG1 are arranged symmetrically. With reference to a straight line passing through the center in the extending direction of the second band portion 2B and perpendicular to the extending direction of the second band portion 2B, the first pressure-sensitive switches SW14 to SW16 and the second pressure-sensitive switches SW24 to SW26 in the second pressure-sensitive switch group SWG2 are arranged symmetrically. The pressure-sensitive switches SW11 to SW13, SW21 to SW23 in the first pressure-sensitive switch group SWG1 overlap with a straight line L1 extending in the left-right direction of the seat SE in a plan view. The pressure-sensitive switches SW14 to SW16, SW24 to SW26 in the second pressure-sensitive switch group SWG2 overlap with a straight line L2 extending in the left-right direction of the seat SE in a plan view. However, it is sufficient that the plurality of pressure-sensitive switches in the first pressure-sensitive switch group SWG1 and the second pressure-sensitive switch group SWG2 are arranged along the left-right direction of the seat SE. For example, the first pressure-sensitive switches SW11 to SW13 and the second pressure-sensitive switches SW21 to SW23 do not have to overlap with the straight line L1 in a plan view, and the first pressure-sensitive switches SW14 to SW16 and the second pressure-sensitive switch SW24 to SW26 do not have to overlap with the straight line L2 in a plan view. The distance between the first pressure-sensitive switch SW11 and the first pressure-sensitive switch SW12 is may be different from the distance between the first pressure-sensitive switch SW11 and the first pressure-sensitive switch SW13, and the distance between the second pressure-sensitive switch SW21 and the second pressure-sensitive switch SW22 may be different from the distance between the second pressure-sensitive switch SW21 and the second pressure-sensitive switch SW23. The distance between the first pressure-sensitive switch SW14 and the first pressure-sensitive switch SW15 may be different from the distance between the first pressure-sensitive switch SW14 and the first pressure-sensitive switch SW16, and the distance between the second pressure-sensitive switch SW24 and the second pressure-sensitive switch SW25 may be different from the distance between the second pressure-sensitive switch SW24 and the second pressure-sensitive switch SW26. In a plan view, the first pressure-sensitive switch SW14 and the first pressure-sensitive switch SW11 do not have to overlap with the straight line L3, and the second pressure-sensitive switch SW24 and the second pressure-sensitive switch SW21 do not have to overlap with the straight line L4, the first pressure-sensitive switch SW15 and the first pressure-sensitive switch SW12 do not have to overlap with the straight line L5, the second pressure-sensitive switch SW25 and the second pressure-sensitive switch SW22 do not have to overlap with the straight line L6, the first pressure-sensitive switch SW16 and the first pressure-sensitive switch SW13 do not have to overlap with the straight line L7, and the second pressure-sensitive switch SW26 and the second pressure-sensitive switch SW23 do not have to overlap with the straight line L8.

Note that, from the viewpoint of more appropriately detecting seating when an occupant is seated on the seat SE in side sitting, it is preferable that the first pressure-sensitive switches SW11 to SW13 and the second pressure-sensitive switches SW21 to SW23 in the first pressure-sensitive switch group SWG1 are arranged in a region sandwiched in the front-rear direction of the seat SE by a first straight line inclined by 80 degrees to one side with respect to the center line CL of the seat SE in the width direction in a plan view, and a second straight line passing through the intersection of the first straight line and the center line CL and inclined by 80 degrees to the other side with respect to the center line CL. It is preferable that the first pressure-sensitive switches SW14 to SW16 and the second pressure-sensitive switches SW24 to SW26 in the second pressure-sensitive switch group SWG2 are arranged in a region sandwiched in the front-rear direction of the seat SE by a third straight line inclined by 80 degrees to one side with respect to the center line CL in a plan view, and a fourth straight line passing through the intersection of the third straight line and the center line CL and inclined by 80 degrees to the other side with respect to the center line CL.

In the above embodiment, the distance between the first pressure-sensitive switch SW11 and the second pressure-sensitive switch SW21 in the first pressure-sensitive switch pair SWP1, and the distance between the first pressure-sensitive switch SW12 and the second pressure-sensitive switch SW22 in the second pressure-sensitive switch pair SWP2, and the distance between the first pressure-sensitive switch SW13 and the second pressure-sensitive switch SW23 in the third pressure-sensitive switch pair SWP3 are the same. The distance between the first pressure-sensitive switch SW14 and the second pressure-sensitive switch SW24 in the fourth pressure-sensitive switch pair SWP4, and the distance between the first pressure-sensitive switch SW15 and the second pressure-sensitive switch SW25 in the fifth pressure-sensitive switch pair SWP5, and the distance between the first pressure-sensitive switch SW16 and the second pressure-sensitive switch SW26 in the sixth pressure-sensitive switch pair SWP6 are the same. However, these distances may be different.

In the above embodiment, the seating sensor 1 is substantially H-shaped as a whole. However, the shape of the seating sensor is not particularly limited. For example, the shape of the seating sensor may be substantially U-shaped. Examples of such a configuration include a configuration in which, in the above embodiment, one end of the third band portion 3B is connected to one end of the first band portion 1B in the extending direction, and the other end of the third band portion 3B is connected to one end in the extending direction of the second band portion 2B.

In the above embodiment, in the first electrode sheet 10, the first electrodes 11F to 16F and the second electrodes 21F to 26F are arranged on one surface of the first insulating sheet 10P, and in the second electrode sheet 20, the first electrodes 11S to 16S and the second electrodes 21S to 26S are arranged on one surface of the second insulating sheet 20P. The pressure-sensitive switch includes an electrode of the first electrode sheet 10 and an electrode of the second electrode sheet 20 facing each other at a predetermined interval. However, it is sufficient that the pressure-sensitive switch is configured to be turned on when a load is applied. For example, a configuration may be adopted in which a conductive sheet such as metal is used instead of the first insulating sheet 10P, and this conductive sheet also serves as the first electrodes 11F to 16F and the second electrodes 21F to 26F. Further, a configuration may be adopted in which a conductive sheet such as metal is used instead of the second insulating sheet 20P, and this conductive sheet also serves as the first electrodes 11S to 16S and the second electrodes 21S to 26S.

As described above, according to the present invention, a seating sensor and a seat device capable of appropriately detecting seating and suppressing false detection of luggage are provided, and can be used in the field of seat devices for vehicles and the like.

The invention claimed is:

1. A seating sensor comprising a first pressure-sensitive switch group including at least six pressure-sensitive switches arranged along a left-right direction of a seat,
    wherein the first pressure-sensitive switch group includes
        three first pressure-sensitive switches and three second pressure-sensitive switches located on one side of the seat in the left-right direction from the three first pressure-sensitive switches,
    the first pressure-sensitive switch group includes
        a first pressure-sensitive switch pair including one of the first pressure-sensitive switches and one of the second pressure-sensitive switches, and another one of the first pressure-sensitive switches and another one of the second pressure-sensitive switches located between the one of the first pressure-sensitive switches and the one of the second pressure-sensitive switches,
        a second pressure-sensitive switch pair including a farthest one of the first pressure-sensitive switches from the second pressure-sensitive switches and a closest one of the second pressure-sensitive switches to the first pressure-sensitive switches, and
        a third pressure-sensitive switch pair including a closest one of the first pressure-sensitive switches to the second pressure-sensitive switches and a farthest one of the second pressure-sensitive switches from the first pressure-sensitive switches, and
    seating is detected when both the first pressure-sensitive switches and the second pressure-sensitive switches in at least one of the first to third pressure-sensitive switch pairs are turned on,
    wherein each of the pressure-sensitive switches in the first pressure-sensitive switch group is located behind a hip point of the seat,
    wherein a distance between each of the pressure-sensitive switches and the hip point in a front-rear direction of the seat is more than 0 mm and 40 mm or less, and
    wherein the hip point is a position of a hip point in a three-dimensional sitting mannequin when the three-dimensional sitting mannequin based on JIS-D4607 is seated on the seat.

2. The seating sensor according to claim 1,
    wherein a distance between the first pressure-sensitive switch and the second pressure-sensitive switch in each of the first to third pressure-sensitive switch pairs is 75 mm or more and less than 120 mm.

3. The seating sensor according to claim 1,
    wherein the pressure-sensitive switches in the first pressure-sensitive switch group overlap with a straight line extending in a left-right direction of the seat in a plan view.

4. The seating sensor according to claim 1, further comprising
    a second pressure-sensitive switch group including at least four of the pressure-sensitive switches arranged along the left-right direction of the seat on a front side of the seat from the first pressure-sensitive switch group, wherein seating is detected when both the first pressure-sensitive switch and the second pressure-sensitive switch in at least one of the first to third pressure-sensitive switch pairs, or at least two of the pressure-sensitive switches in the second pressure-sensitive switch group are turned on.

5. The seating sensor according to claim 4,
wherein the second pressure-sensitive switch group includes pressure-sensitive switch pairs respectively corresponding to each of the first to third pressure-sensitive switch pairs in the first pressure-sensitive switch group.

6. The seating sensor according to claim 5,
wherein one of the pressure-sensitive switches in each of the pressure-sensitive switch pairs of the second pressure-sensitive switch group and the first pressure-sensitive switch in the pressure-sensitive switch pair of the first pressure-sensitive switch group corresponding to the each of the pressure-sensitive switch pairs overlap with a straight line extending in the front-rear direction of the seat in a plan view, and
another one of the pressure-sensitive switches in each of the pressure-sensitive switch pairs of the second pressure-sensitive switch group and the second pressure-sensitive switch in the pressure-sensitive switch pair in the first pressure-sensitive switch group corresponding to the each of the pressure-sensitive switch pairs overlap with another straight line extending in the front-rear direction of the seat in a plan view.

7. The seating sensor according to claim 4,
wherein the hip point is positioned between the second pressure-sensitive switch group and the first pressure-sensitive switch group in the front-rear direction of the seat.

8. A seat device comprising:
the seating sensor according to claim 1; and
a cushion pad on which the seating sensor is arranged on a surface,
wherein the three first pressure-sensitive switches are located on one side from a center in a left-right direction of the seat, and the three second pressure-sensitive switches are located on another side of the center in the left-right direction of the seat.

* * * * *